(12) United States Patent
Takeuchi

(10) Patent No.: US 8,661,183 B2
(45) Date of Patent: Feb. 25, 2014

(54) COMPUTER SYSTEM, DATA STORAGE METHOD, AND PROGRAM FOR REDUCTION OF STORED DATA AFTER HIBERNATION

(75) Inventor: Takashi Takeuchi, Tokyo (JP)

(73) Assignee: NEC Corporation, Tokyo (JP)

( * ) Notice: Subject to any disclaimer, the term of this patent is extended or adjusted under 35 U.S.C. 154(b) by 451 days.

(21) Appl. No.: 13/129,338

(22) PCT Filed: Nov. 18, 2009

(86) PCT No.: PCT/JP2009/069428
§ 371 (c)(1),
(2), (4) Date: May 13, 2011

(87) PCT Pub. No.: WO2010/055937
PCT Pub. Date: May 20, 2010

(65) Prior Publication Data
US 2011/0225343 A1    Sep. 15, 2011

(30) Foreign Application Priority Data

Nov. 17, 2008 (JP) ................................. 2008-293776

(51) Int. Cl.
*G06F 12/00* (2006.01)
(52) U.S. Cl.
USPC ................ 711/6; 711/170; 711/206; 711/207
(58) Field of Classification Search
USPC ....................................... 711/6, 170, 206, 207
See application file for complete search history.

(56) References Cited

U.S. PATENT DOCUMENTS

| 6,609,182 B1 * | 8/2003 | Pedrizetti et al. .............. 711/159 |
| 8,327,171 B2 * | 12/2012 | Reece et al. .................. 713/320 |
| 2007/0277051 A1 * | 11/2007 | Reece et al. .................. 713/323 |
| 2010/0037076 A1 * | 2/2010 | Reece et al. .................. 713/324 |
| 2010/0306173 A1 * | 12/2010 | Frank ............................ 707/640 |
| 2012/0185715 A1 * | 7/2012 | Reece et al. .................. 713/323 |

FOREIGN PATENT DOCUMENTS

| JP | 10-333997 A | 12/1996 |
| JP | 2001022464 A | 1/2001 |
| JP | 2006-113767 A | 4/2006 |

OTHER PUBLICATIONS

Japanese Office Action for JP Application No. 2010-537824 mailed on Sep. 3, 2013 with Partial English Translation.
International Search Report for PCT/JP2009/069428 mailed Dec. 15, 2009.
C. P. Sapuntzakis et al., "Optimizing the Migration of Virtual Computers", ACM, 2002.
H. Kawasaki et al, "A study on efficient transfer method for virtual computation environment", IPSJ SIG Technical Report, 2006-OS-103 (10), 2006, pp. 117-123.
K. Suzaki, "Current Implementation of Network Transferable Computer", IPSJ SIG Notes, vol. 2000, No. 43, 2000, pp. 149-156.

* cited by examiner

Primary Examiner — John Lane
(74) Attorney, Agent, or Firm — Sughrue Mion, PLLC

(57) ABSTRACT

In a computer system that can configure a virtual machine being able to transit to a hibernation state, data of a main memory of the virtual machine stored in an auxiliary storage device is reduced. At a point in time when the virtual machine has transitioned to a hibernation state, from consideration as to whether the data of the main memory of the virtual machine stored in the auxiliary storage device is unnecessary, data stored in the auxiliary storage device is rewritten in order to reduce the data.

45 Claims, 16 Drawing Sheets

FIG. 2

| PAGE NUMBER | PAGE CACHE FLAG | MAPPING FILE | INDEX | PAGE REFERENCE COUNTER | PAGE DIRTY FLAG |
|---|---|---|---|---|---|
| 1 | SET | 0x00000010 | 0x00000010 | 2 | SET |
| 2 | CLEAR | - | - | 1 | CLEAR |
| ...... | | | | | |

FIG. 3

| POSITION | DATA |
|---|---|
| 0xC0023100 | PAGE MANAGEMENT TABLE |

| FILE ID | FILE NAME INCLUDING PATH |
|---|---|
| 123456 | /usr/....../aaa.txt |
| 2345567 | /home/....../bbb.sh |
| 3456678 | /etc/....../config |
| 4567789 | /bin/....../exec |
| ...... | ...... |

FIG. 5

| START ADDRESS | SIZE |
|---|---|
| 0x00000000 | 237,568 BYTES |
| 0x00100000 | 2,097,152 BYTES |
| ...... | | ably by software or the like on a real computer. In particular, with

COMPUTER SYSTEM, DATA STORAGE METHOD, AND PROGRAM FOR REDUCTION OF STORED DATA AFTER HIBERNATION

DESCRIPTION OF RELATED APPLICATION

The present invention is the National Phase of PCT/JP2009/069428, filed Nov. 16, 2009, which is based upon and claims the benefit of priority of Japanese Patent Application No. 2008-293776 (filed on Nov. 17, 2008) the disclosure of which is incorporated herein in its entirety by reference thereto.

TECHNICAL FIELD

The present invention relates to a computer system, a data storage method and a program, and in particular, to a computer system, a method and a computer-readable storage medium storing a program, which can configure a virtual machine having a hibernation function.

BACKGROUND

A function for stopping a real computer or a virtual machine, such as a notebook computer or the like, is a function referred to as hibernation. When hibernation is executed, the computer stores data and the like of a main memory in a nonvolatile auxiliary storage device, and cuts off a power supply. This state is referred to as a hibernation state or a suspend state.

A virtual machine is a computer that is realized virtually by software or the like on a real computer. In particular, with regard to the virtual machine, a system virtual machine has a virtual CPU, a virtual main memory, a virtual auxiliary storage device, and the like. As application examples of the virtual machine, there are examples where a computer user is able to use a plurality of computers on one real computer.

Data of the virtual main memory of the virtual machine is stored in a file in the real computer. The file is called a physical memory file.

With regard to hibernation, there has been a problem in that, when a large amount of memory is allocated to the virtual machine, the amount of data to be stored in the auxiliary storage device of the real computer becomes large.

Thus, in order to solve this type of problem, there has been proposed a method of reducing the data in the main memory to be stored in the auxiliary storage device, for example, as disclosed in Non-Patent Document 1, Patent Document 1, and Patent Document 2.

A description is given concerning a computer system disclosed in Non-Patent Document 1, using FIG. 15. The computer system is configured from a virtual machine 2100, a memory file 2200, and a memory file compression unit 2300, included in a real computer 2001.

The virtual machine 2100 is configured from an operating system (referred to below as OS) 2101 and a memory usage part 2102.

The OS 2101 has functions for managing a virtual main memory of the virtual machine 2100, and by these functions, memory pages that can be destroyed are recovered from the virtual main memory, and memory pages are allocated to a program operating in the virtual machine 2100.

The memory usage part 2102 makes a request for allocation of memory pages with respect to the OS 2101 during operation of the virtual machine, and writes data suitable for compression to the allocated memory pages.

The memory file 2200 is a file in which the data of the virtual main memory of the virtual machine 2101 is written. The file is stored in an auxiliary storage device (not shown in the drawings) of the real computer 2001.

The memory file compression unit 2300 compresses the memory file 2200 after the virtual machine 2100 transitions to a hibernation state.

A conventional computer system having this type of configuration operates the memory usage part 2102 during operation of the virtual machine 2100. The memory usage part 2102 makes a request for memory pages to the OS 2101, performs an allocation, and writes data suitable for compression to the allocated memory pages. With regard to the memory usage part 2102, by executing the request and writing the data suitable for compression, the computer system increases memory pages in which data suitable for compression has been written, inside the virtual main memory. As a result, after the virtual machine 2100 has transitioned to the hibernation state, when the memory file 2200 is compressed in the memory file compression unit 2300, it is possible to compress the memory file 2200 at a higher compression ratio, so that the size of the memory file can be made smaller.

Patent Document 1 relates to a data save control method for a real computer, and, as shown in FIG. 16, is configured from a BIOS 3101, an OS 3102, and a high speed hibernation software driver 3103.

A computer system having this type of configuration operates as follows. Specifically, when a hibernation message is issued from the OS 3102, the high speed hibernation software driver 3103, in response to the hibernation message, requests memory management information (page information) showing present memory state, with respect to the OS 3102. The page information shows mapping information of a program (process) corresponding to a page actually present in the main memory (not shown in the drawings) of the real computer of Patent Document 1, and is managed by the OS 3102 in order to execute demand paging in order to realize a virtual memory mechanism.

The high speed hibernation software driver 3103, on receiving page information from the OS 3102, based on the present usage state of the main memory shown by the page information, checks physical memory addresses with regard to other pages outside of empty pages and discardable pages, and uses a file system of the OS 3102 to save the memory content thereof to a HDD (not shown in the drawings) of the real computer of Patent Document 1. When save processing is completed, the high speed hibernation software driver gives a power-off instruction to the BIOS 3101, and in response to this, power-off processing that turns OFF a power supply of the system is executed by the BIOS 3101 with respect to a power supply controller of the real computer of Patent Document 1.

Outside of this, Patent Document 2 discloses a hibernation device that evaluates system performance at a time of hibernation or wakeup, and according to the evaluation, determines whether or not to perform compression of memory content at the next and subsequent hibernation.

[Patent Document 1]
Japanese Patent Kokai Publication No. JP-A-10-333997
[Patent Document 2]
Japanese Patent Kokai Publication No. JP-P2001-22464A
[Non-Patent Document 1]
Constantine P. Sapuntzakis, et al., "Optimizing the Migration of Virtual machines" ACM, 2002, pp. 377-390.

SUMMARY

The entire disclosures of the abovementioned Patent Documents 1 and 2, and Non-Patent Document 1 are incorporated herein by reference thereto. An analysis is given below of related technology according to the present invention. A computer system described in Non-Patent Document 1 recovers memory pages that can be destroyed, during operation of a virtual machine. For this reason, even if the memory pages being used by the virtual machine during operation become discardable pages at a point in time when the virtual machine goes into a hibernation state, they are not destroyed. As a result, even with discardable pages, there may be pages present that are not discarded.

Furthermore, in a case where a data save control method as described in Patent Document 1 is applied to a virtual machine, a high speed hibernation software driver stores data of other pages outside of empty pages and discardable pages, using a file system of an OS. For this reason, even if the memory pages being used during operation of the OS become discardable pages at a point in time when the virtual machine including the OS goes into a hibernation state, they are not discarded.

Furthermore, similar to a case where a hibernation device of Patent Document 2 is applied to a virtual machine, since operating efficiency is optimized before a hibernation state, even if memory pages being used during operation of the virtual machine become discardable pages at a point in time when the virtual machine goes into a hibernation state, they are not discarded.

As an example of memory pages that are not discarded even if discardable as described above, it is possible to cite memory pages in virtual memory, allocated to disk cache by an OS operating inside a virtual machine.

The disk cache is cache allocated to main memory in order to speed up writing and reading of data with regard to an auxiliary storage device such as a hard disk or the like, and is installed in a general OS such as Linux, irrespective of virtual machine or real computer.

When data is read from the auxiliary storage device, such OSs store the read data as a disk cache in the main memory. For this reason, when the same data is read once again, by reading from the disk cache, not from the auxiliary storage device, it is possible to speed up reading from the auxiliary storage device virtually. Similarly, when data is written to the auxiliary storage device, the data for writing is stored as a cache in the main memory, not in the auxiliary storage device. For this reason, it is possible to speed up writing to the auxiliary storage device virtually. The data stored in the latter disk cache is collectively written to the auxiliary storage device at regular intervals, by a dedicated process (daemon). Thus, data is synchronized between the disk cache and the auxiliary storage device. In this way, the data stored in the disk cache is also present in the auxiliary storage device as long as it is synchronized. For this reason, the disk cache that is synchronized has memory pages that are discardable.

However, as long as a disk cache mechanism is not explicitly stopped, every time the OS writes or reads the auxiliary storage device, memory pages are used as the disk cache.

In a case where the OS described above is an OS inside the virtual machine, as long as the disk cache mechanism is not explicitly stopped, memory pages in the virtual memory are used as the disk cache.

As described above, in the computer systems described in Patent Documents 1 and 2, and in Non-Patent Document 1, memory pages allocated as disk cache by the OS inside the virtual machine are used during operation of the virtual machine, but there is a problem in that at a point in time when a hibernation state occurs, the discardable pages cannot all be discarded.

The present invention has been carried out based on the abovementioned consideration, and it is an object thereof to provide a computer system, a data storage method, and a computer program, which can further reduce data of a main memory stored in an auxiliary storage device.

According to a first aspect of the present invention, there is provided a computer system that can configure a virtual machine being able to transit to a hibernation state, the system having a physical memory file rewriting processor for rewriting a physical memory file that stores data of a virtual main memory of the virtual machine, so as to enable reduction of data stored in an auxiliary storage device, after the virtual machine transitions to a hibernation state.

According to a second aspect of the present invention, there is provided a data storage method of storing data included in a physical memory file that stores data of a virtual main memory of a virtual machine, the method including rewriting the physical memory file, so as to enable reduction of data stored in an auxiliary storage device, after the virtual machine transitions to a hibernation state.

According to a third aspect of the present invention, there is provided a computer program for storing data included in a physical memory file that stores data of a virtual main memory of a virtual machine, the program executing on a real computer a process of rewriting the physical memory file, so as to enable reduction of data stored in an auxiliary storage device, after the virtual machine transitions to a hibernation state. The program may be stored on a computer-readable storage medium. Also the program may be regarded as either a program product (i.e. manufacture) or a process embodying the data storage method (process), expressed in a program language.

The meritorious effects of the present invention are summarized as follows.

According to the present invention, it is possible to reduce data of a main memory stored in an auxiliary storage device. A reason for this is that rewriting is performed so as to enable discarding not only discardable memory pages during operation of a virtual machine, but also of discardable memory pages at a point in time at which a hibernation state is entered.

BRIEF DESCRIPTION OF THE DRAWINGS

FIG. 2 is a diagram showing an example of a page management table of the first exemplary embodiment of the present invention.

FIG. 3 is a diagram showing an example of a physical memory file management table of the first exemplary embodiment of the present invention.

FIG. 4 is a diagram showing an example of a file management table of the first exemplary embodiment of the present invention.

FIG. 5 is a diagram for describing a storage format of a file of the first exemplary embodiment of the present invention.

PREFERRED MODES

An outline of an exemplary embodiment of the present invention will now be described. In the present exemplary embodiment, after a virtual machine transitions to a hibernation state (refer to YES in step S101 of FIG. 6) a computer system performs a check of memory pages of the virtual machine. By this check, for example, it becomes possible to identify discardable data in a disk cache or memory pages that are not referenced. Based on a result thereof, the computer system is arranged to perform processing of rewriting (optimizing) the physical memory file so as to enable reduction of data stored in an auxiliary storage device.

As a specific example of the rewriting (optimizing), for example, rewriting so as to enable compression at a higher compression ratio of memory pages that are not referenced (refer to steps S104 and S105 of FIG. 6) or deletion may be considered.

As described above, at a point in time when there is a transition to a hibernation state, since rewriting of a physical memory file is performed so as to compress or delete memory pages that are not discarded irrespective of the fact that they can be discarded as described above, it is possible to reduce data stored in the auxiliary storage device of the computer system.

First Exemplary Embodiment

Next, a description is given concerning a first exemplary embodiment of the present invention, making reference to the drawings. In the first exemplary embodiment, as an example of discardable memory pages, use is made of memory pages allocated as disk cache. In the following, these pages are termed cache pages.

Figure 1:
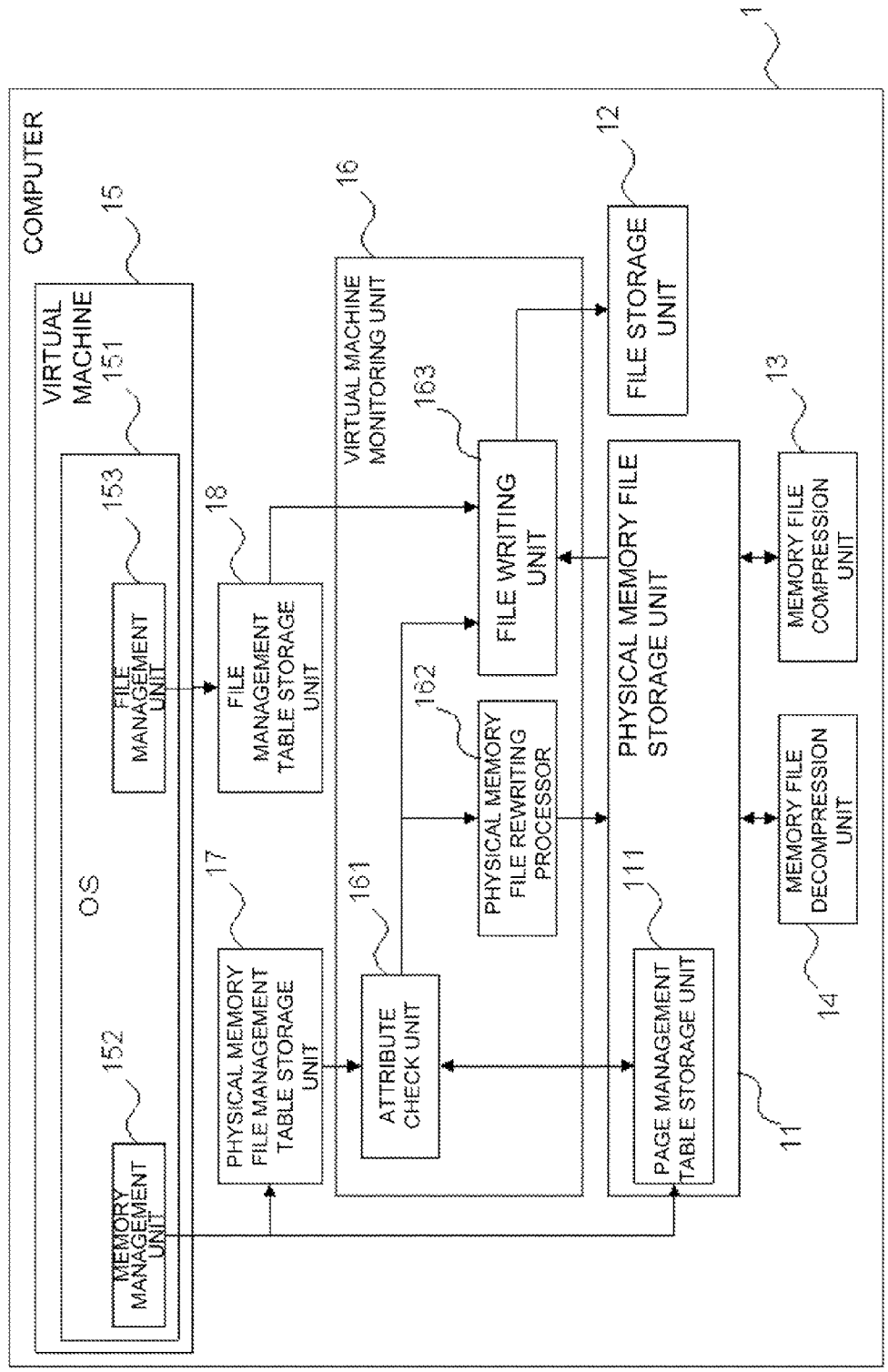
FIG. 1 is a block diagram showing a configuration of a computer system according to a first exemplary embodiment of the present invention.

FIG. 1 is a block diagram showing a configuration of a computer system (computer) according to the first exemplary embodiment of the present invention.

Referring to FIG. 1, the computer 1 is shown which is provided with: a physical memory file storage unit 11, a file storage unit 12, a memory file compression unit 13, a memory file decompression unit 14, a virtual machine 15, a virtual machine monitoring unit 16, a physical memory file management table storage unit 17, and a file management table storage unit 18.

The physical memory file storage unit 11 stores a physical memory file, which is a file for storing data of a virtual main memory used by the virtual machine 15. The physical memory file storage unit 11 includes a page management table storage unit 111.

A page management table storage unit 111 stores a page management table, which is a table for managing attributes of respective memory pages included in the physical memory file described above.

FIG. 2 shows an example of the page management table. Referring to FIG. 2, the page management table has an entry for each memory page, and is made up of members as below, showing attributes of memory pages.

Page Cache Flag: This is a flag showing whether the page in question is a cache page. If set, it shows that the page in question is a cache page.

Mapping File: In a case where the page in question is a cache page, this holds data cached by the page in question and shows a file ID of the file.

Index: In a case where the page in question is a cache page, this shows as an offset which position of a file with a file ID described in the abovementioned mapping file the page in question corresponds to. A method of representing the offset may be in page units or may be in byte units.

Page Reference Counter: This is a counter showing whether the page in question is being used. If a value thereof is 0, this shows that the page in question is unused, and if a positive number, this shows that the page is being used.

Page Dirty Flag: This is a flag showing whether data of the page in question has been changed. If the page in question is a cache page, and furthermore the flag is set, this shows that the data of the page in question is different from data at a position corresponding to a file with a file ID described in the abovementioned mapping file.

The file storage unit 12 stores a virtual auxiliary storage device of the virtual machine 15 as a disk image file.

The memory file compression unit 13 compresses a physical memory file.

The memory file decompression unit 14 decompresses the physical memory file.

The virtual machine 15 is a virtual machine that virtually realizes a main memory, an auxiliary storage device, or the like, and includes an OS 151.

The OS 151 is an OS that operates inside the virtual machine 15, manages virtual hardware of the virtual machine 15, and abstracts the virtual hardware with respect to user processes operating inside the virtual machine 15. The OS 151 further includes a memory management unit 152 and a file management unit 153.

The memory management unit 152 manages a virtual main memory of the virtual machine 15, and sets attributes of the memory pages thereof in the abovementioned page management table. Furthermore, a virtual physical address sent to the virtual machine monitoring unit 16 during operation of the virtual machine 15, and the type of data this is an address of, are recorded in the physical file management table. In particular, the virtual physical address of a page management table sent to the virtual machine monitoring unit 16 from the memory management unit 152 is recorded in the physical memory file management table.

The physical memory file management table is a table for managing what type of data is present at what address of a physical memory file. The physical memory file management table of the present exemplary embodiment is a table showing what address the page management table is present at.

FIG. 3 shows an example of the physical memory file management table. The physical memory file management table is stored in a physical memory file management table storage unit 17.

When recording to the physical memory file management table by the memory management unit 152 is performed, in a case where the memory management unit 152 directly writes to the physical memory file management table, it is necessary to correctly set access rights to a storage unit included in the computer 1, and to arrange such that the memory management unit 152 cannot access outside of the physical memory file management table storage unit 17. For example, by adopting a method of interposing the virtual machine monitoring unit 16 and writing to the physical memory file management table, being monitored by the virtual machine monitoring unit 16, such as a method in which the memory management unit 152 sends, as a message to the virtual machine monitoring unit 16, data to be recorded in the physical memory file management table, and the virtual machine monitoring unit 16 writes to the physical memory file management table, security of the computer 1 is increased.

The file management unit 153 manages the virtual auxiliary storage device of the virtual machine 15. Furthermore, the file management unit 153, during operation of the virtual machine 15, records the "file ID" and the "file name including path" of a file stored in the virtual auxiliary storage device of the virtual machine 15, in the file management table. In addition, the virtual machine 15, when it has a plurality of virtual auxiliary storage devices, also records relationship information when these are mounted, in the file management table. The "file ID" is a file-specific identification code, for example, i node.

The file management table is a table for managing where and what type of file is present in the file storage unit 12.

FIG. 4 shows an example of the file management table. The "file ID" and the "file name including path" of a file, stored in at least the virtual machine 15 and cached in a cache page, are recorded in the file management table.

With regard to recording in the file management table by the file management unit 153, similar to the memory management unit 152, it is necessary to correctly set access rights to the storage unit included in the computer 1. In this case also, by interposing the virtual machine monitoring unit 16, and arranging such that writing is performed to the file management table, being monitored by the virtual machine monitoring unit 16, the security of the computer 1 is increased.

The virtual machine monitoring unit 16 operates the virtual machine 15 by the computer 1, and in particular performs conversion between the virtual hardware of the virtual machine 15 and the real hardware of the computer 1. The virtual machine monitoring unit 16 is configured by including an attribute check unit 161, a physical memory file rewriting processing unit 162, and a file writing unit 163.

After the virtual machine 15 transitions to a hibernation state, the attribute check unit 161 refers to attributes of memory pages included in the physical memory file of the virtual machine 15 stored in the physical memory file recording unit 11, and performs processing according to the attributes.

More specifically, after the virtual machine 15 transitions to a hibernation state, the attribute check unit 161 first refers to the physical memory file management table, and confirms where the page management table is in the physical memory file. Next, the attribute check unit 161 refers to the page management table from the physical memory file, and checks attributes of the memory pages included in the physical memory file. As a result of the check, in a case where the "page reference counter" of a checked memory page is 0, the attribute check unit 161 makes a request for a change of data of the page in question to the physical memory file rewriting processor 162.

In addition, as a result of the attribute check, in a case where the "cache flag" of the checked memory page is set, and the "dirty flag" is clear, the attribute check unit 161 makes a request for rewriting of the page in question to the physical memory file rewriting processor 162, and after completion of the rewriting, initializes the entry of the page in question. Furthermore, in a case where the "cache flag" of the checked memory page is set, and the "dirty flag" is also set, the attribute check unit 161, after writing back the data of the page in question in the file writing unit 163 to the file storage unit 12, makes a request for rewriting of the page in question to the physical memory file rewriting processor 162, and additionally, initializes the entry of the page in question. It is to be noted that the initialization of the entry of the page in question includes, for example, clearing the "cache flag" or the "dirty flag", and changing the "page reference counter" to 0.

The physical memory file rewriting processor 162, in response to the request of the attribute check unit 161, rewrites the memory page requested. As examples of rewriting methods, the following may be considered. One example thereof is a method of rewriting data that can be compressed at a higher compression ratio, such as 0 padding, for a page that is a target of rewriting. Another example that may be cited is a method of deleting a page that is a target for rewriting, and padding before and after the page. In the latter method, when the virtual machine 15 is resumed, in order that data that could not be rewritten can exist once again at the same virtual physical address, as shown in FIG. 5 for example, it is necessary to store start address and size of the region of the data that could not be rewritten. In the example of FIG. 5, the size is expressed in units of bytes, but may be stored in numbers of pages.

The file writing unit 163, in response to a request of the attribute check unit 161, writes back data of a memory page that is a target for writing back, of the physical memory file, to a corresponding file of the file storage unit 12, which is the virtual auxiliary storage device of the virtual machine 15.

More specifically, the file writing unit 163 receives values of the "mapping file" and the "index" of the targeted memory page, from the page management table, at the same time as the write-back request from the attribute check unit 161. Next, the file writing unit 163 compares the "file ID", which is the value of the abovementioned "mapping file", and the "file ID" described in the file management table that is in the file management table storage unit 18, and obtains the "file name including path". Next, the file writing unit 163 mounts the disk image file stored in the file storage unit 12, identifies a data write-back file from the abovementioned "file name including path", and in addition determines a data write-back position in the file from the abovementioned "index", and writes back the data. It is to be noted that in a case where a plurality of disk image files are present in the file storage unit 12, that is, a plurality of virtual auxiliary storage devices are present in the virtual machine 15, the file writing unit 163 mounts the disk image file, based on relationship information concerning mounting, sent from the file management unit 153.

The physical memory file management table storage unit 17 stores the physical memory file management table (refer to FIG. 3) described above.

The file management table storage unit 18 stores the file management table (refer to FIG. 4) described above.

Figure 6:
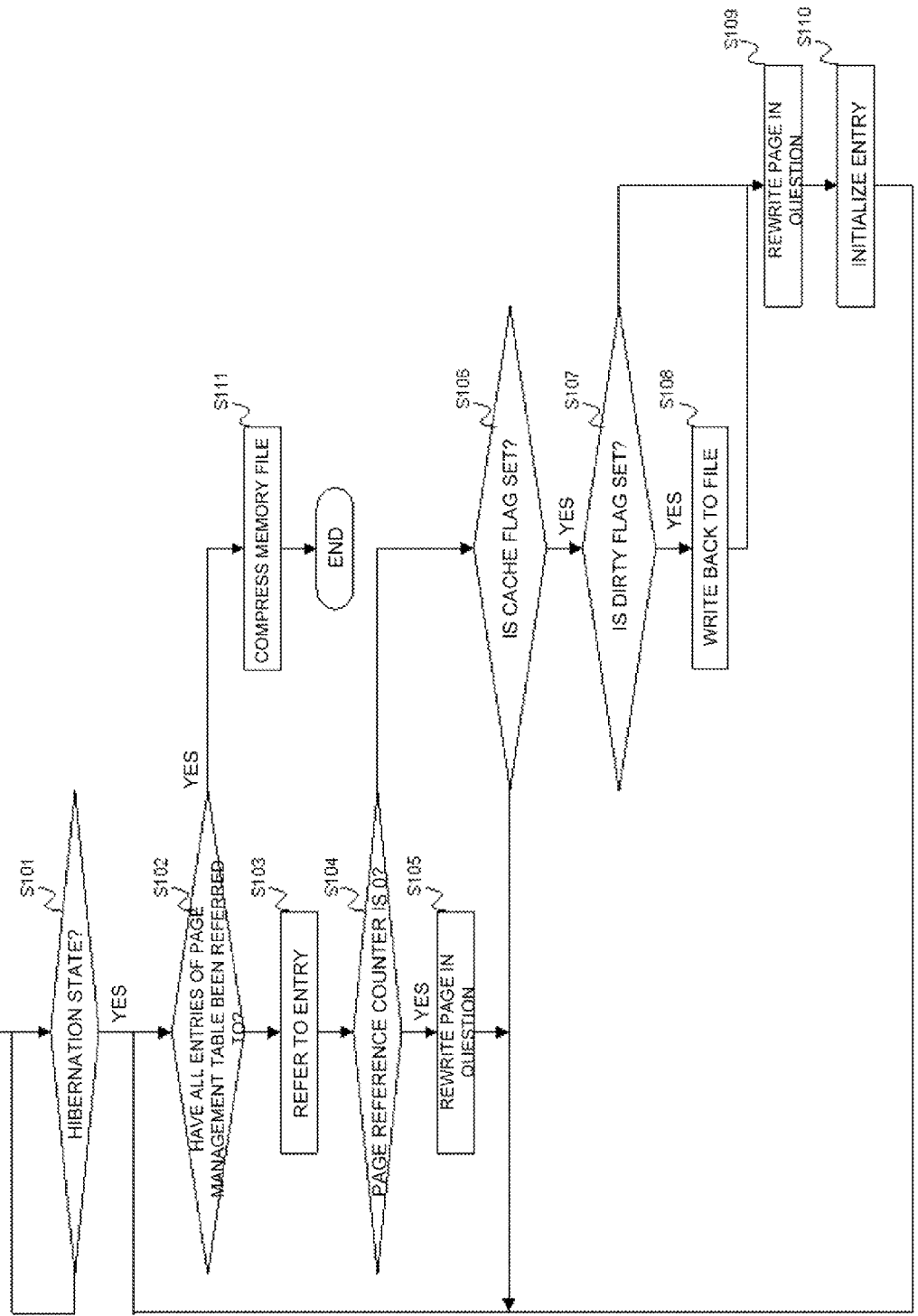
FIG. 6 is a flowchart for describing operation of the computer system according to the first exemplary embodiment of the present invention.

Next, a description is given concerning operation of the present exemplary embodiment, making reference to the drawings. FIG. 6 is a flowchart representing an operation of size reduction of the physical memory file, after the virtual machine of the present exemplary embodiment has transitioned to a hibernation state.

The virtual machine monitoring unit 16 confirms that the virtual machine 15 is in a hibernation state (step S101).

The attribute check unit 161 of the virtual machine monitoring unit 16 confirms whether or not all entries of the page management table have been referred to (step S102). If all entries have been referred to, the memory file compression unit 13 compresses the physical memory file (step S111). If all entries have not been referred to, reference is made to an entry (step S103).

The attribute check unit 161 refers to a "page reference counter" of an entry (step S104), and if the "page reference counter" is 0, a request for rewriting of the page in question is made to the physical memory file rewriting processor (step S105), and control returns to step S102 in order to refer to the next entry.

On the other hand, in a case where the page reference counter is a positive number, the attribute check unit 161 refers to the "cache flag" (step S106). In a case where the "cache flag" is set, the attribute check unit 161 refers to the "dirty flag" (step S107). Meanwhile, in a case where the "cache flag" is clear, the attribute check unit 161 returns to step S102 to refer to the next entry.

In a case where the "dirty flag" is set (step S107), the attribute check unit 161 requests the file writing unit 163 to write back the data of the page in question to the file storage unit 12 (step S108).

In a case where writing back by the file writing unit 163 is completed, or the "dirty flag" is clear, the attribute check unit 161 requests the physical memory file rewriting processor 162 to rewrite the page in question (step S109).

Thereafter, the attribute check unit 161 initializes the entry of the page in question (step S110), and returns to step S102 in order to refer to the next entry.

Figure 7:
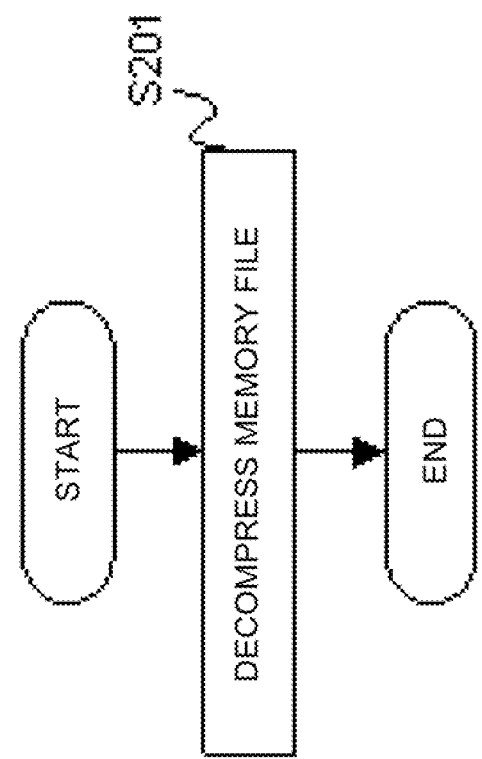
FIG. 7 is a second flowchart for describing operation of the computer system according to the first exemplary embodiment of the present invention.

Next, referring to a flowchart of FIG. 7, a detailed description is given concerning a decompression operation of the physical memory file, before the virtual machine of the present exemplary embodiment resumes.

The virtual machine monitoring unit 16 decompresses the physical memory file in the memory file decompression unit 14, before the virtual machine 15 is resumed (step S201). At this time, in a case where the decompressed physical memory file has a format in which a page that is a target of rewriting is deleted, a similar number of pages as memory pages that have been deleted are inserted at a position of the memory pages that have been deleted. Any type of data may be written to the inserted pages, but it is desirable that data to be written is the same as the initialized memory pages provided to a computer program operating in the OS 151.

Next, a description is given concerning an effect of the present exemplary embodiment.

As described above, in the present exemplary embodiment, during operation of the virtual machine the memory management unit of the virtual machine sets attributes of the memory pages of a virtual main memory in the page management table, and after the virtual machine transitions to a hibernation state, the attribute check unit of the virtual machine monitoring unit checks the page management table, and after rewriting the data of a discardable memory page to data suitable for compression, compression is performed or the memory page in question is deleted. Therefore, even with a memory page to be used during operation of the virtual machine, in a case of a discardable memory page at the time of a transition to a hibernation state, it is possible to assuredly compress or delete the memory page in question.

It is to be noted that in the present exemplary embodiment, as an example of a discardable page, a disk cache of the OS for a virtual machine has been taken as an example, but according to the OS, there are also memory pages that are discardable at the time at which the virtual machine transitions to a hibernation state, outside of the disk cache. It will be clear to a person skilled in the field that the present invention can be applied also to these memory pages.

Second Exemplary Embodiment

Next, a detailed description is given concerning a second exemplary embodiment of the present invention, making reference to the drawings. In the first exemplary embodiment described above, after a virtual machine 15 transitions to a hibernation state, dirty cache pages were written back to a file storage unit 12, but in the second exemplary embodiment, the dirty cache pages are written back to the file storage unit 12 at an arbitrary point in time before the hibernation of the virtual machine 15 is completed. As a result, management of a "file ID" and "file name including path" in the virtual machine 15 are unnecessary, and in addition, file writing processing after transition to the hibernation state can be made unnecessary.

Figure 8:
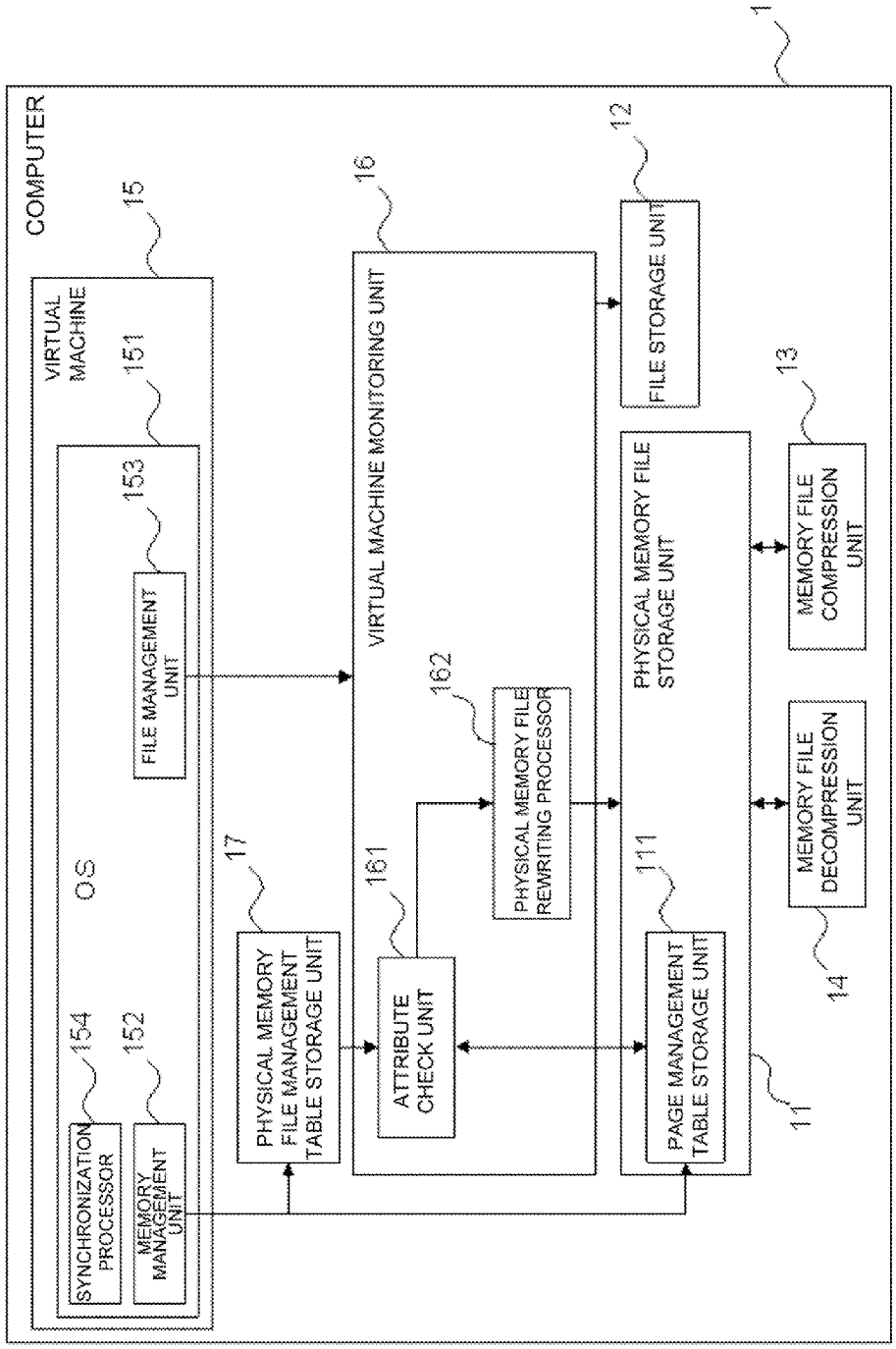
FIG. 8 is a block diagram showing a configuration of a computer system according to a second exemplary embodiment of the present invention.

FIG. 8 is a block diagram showing a configuration of a computer system (computer) according to the second exemplary embodiment of the present invention.

Referring to FIG. 8, in the second exemplary embodiment of the present invention, a synchronization processor 154 is added to an OS 151 of the first exemplary embodiment of the present invention. Conversely, a file management table storage unit 18 and a file writing unit 163 of a virtual machine monitoring unit 16 are removed. Furthermore, a file management unit 153 is modified, with respect to the first exemplary embodiment.

By the synchronization processor 154 writing data stored in cache pages of a virtual main memory of the virtual machine 15 to a virtual auxiliary storage device of the virtual machine 15, data is synchronized between the disk cache and the auxiliary storage device. Timing of executing the synchronization may be at an arbitrary point in time before hibernation is completed, but from a viewpoint of performance, in particular, when hibernation is executed for the virtual machine 15, it is desirable that action be taken to necessarily synchronize just before the OS 151 of the virtual machine 15 is stopped.

The file management unit 153, similar to the first exemplary embodiment, manages the virtual auxiliary storage device of the virtual machine 15, and in addition when files of the virtual machine 15 are written to a file storage unit 12 according to a setting, writing is possible without using the disk cache. The setting is called a non-usage setting of the disk cache in the present specification. After a final synchronization before the OS 151 is stopped, by a synchronization processor 154, the file management unit 153 makes a non-usage setting for the disk cache, and in file writing performs writing without using the disk cache.

It is to be noted that in a state where the disk cache has been set to non-usage, in a case where data of a cached file is written to a cached portion, when data is written to a file only, a mismatch occurs between the disk cache and the file. For this reason, when data is written to the cached portion described above, it is necessary to perform processing such as writing both corresponding file and the cache page in question, or writing only the corresponding file, and initializing an entry of the cache page in question, or updating (re-caching) the page in question after writing to only the corresponding file.

Figure 9:
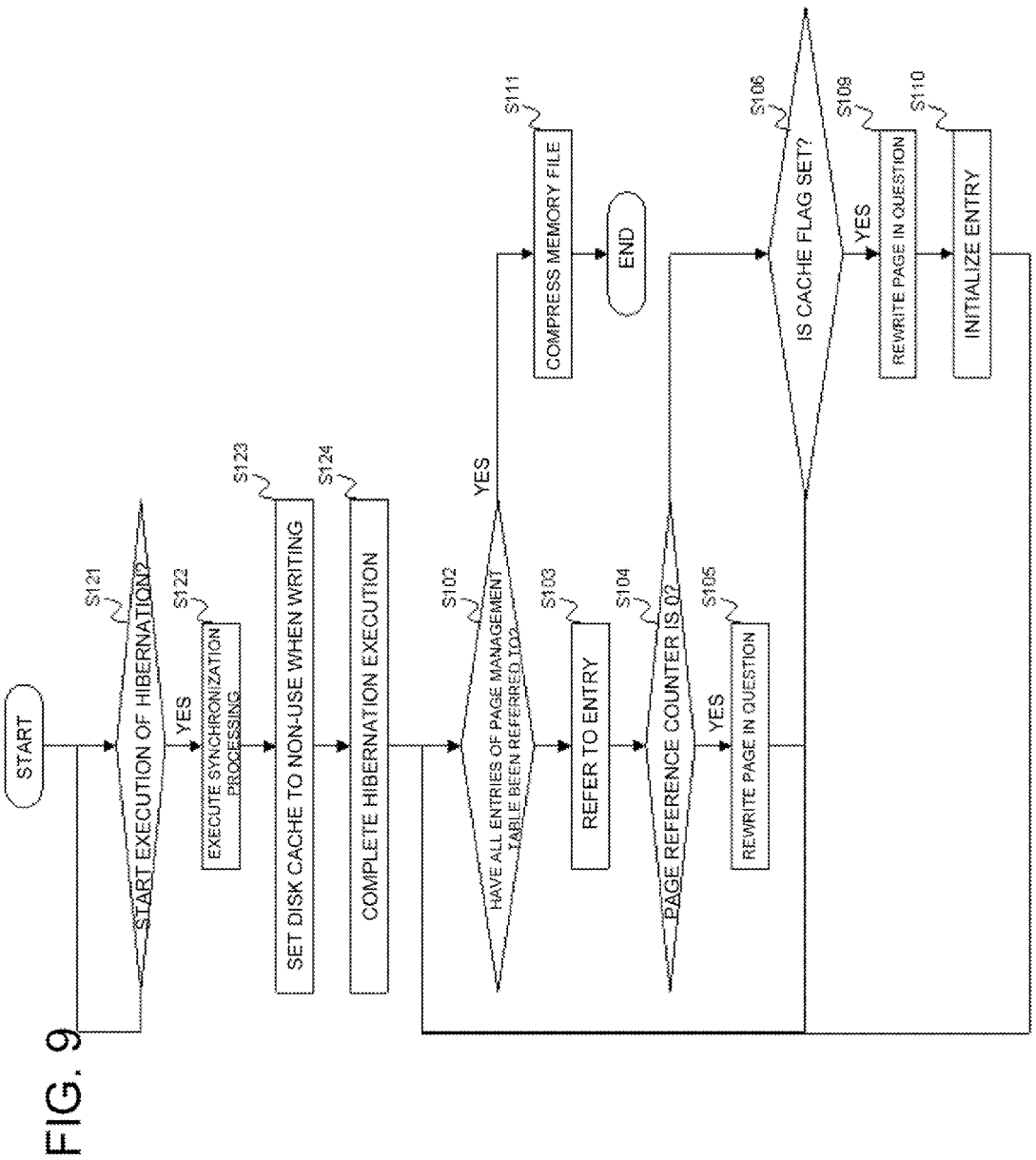
FIG. 9 is a flowchart for describing operation of the computer system according to the second exemplary embodiment of the present invention.

Next, a detailed description is given concerning operation of the present exemplary embodiment, making reference to the drawings. FIG. 9 is a flowchart representing an operation of size reduction of a physical memory file, during execution of hibernation by the virtual machine of the present exemplary embodiment and after there has been a transition to a hibernation state.

In the present exemplary embodiment, instead of step S101 of a flowchart (FIG. 6) of the first exemplary embodiment, step S121 to step S124 are added, and step S107 to step S108 are removed.

Referring to FIG. 9, first, in a case where a virtual machine monitoring unit 16 makes a request to the virtual machine 15, or the virtual machine 15 itself starts execution of hibernation (step S121), the synchronization processor 154 executes synchronization processing, and data of memory pages that are cache pages for writing is written to the file storage unit 12 (step S122).

At a point in time when the synchronization processing is completed, the synchronization processor 154 makes a setting not to use the disk cache when writing to the file storage unit 12 thereafter, with respect to the file management unit 153 (step S123). By this setting, since the cache pages that are dirty are no longer present thereafter, writing back of dirty cache pages to the file storage unit 12, after transition to a hibernation state, becomes unnecessary.

By the virtual machine 15 transitioning to the hibernation state, the execution of the hibernation is completed (step S124).

Steps from step S102 onwards are similar to the first exemplary embodiment. However, as described above, since writing back of the dirty cache pages to the file storage unit 12 becomes unnecessary, step S106 to step S107 are deleted.

It is to be noted that timing of the synchronization processing and performing a setting to have the disk cache unused may be any timing during execution of the hibernation, and in addition may be before starting hibernation execution, but is desirably as close as possible to just before executing a transition to the hibernation state.

This is for the following reason. When the disk cache is made unused, the writing of data to a virtual auxiliary storage device thereafter is not to cache pages in a virtual main memory, but is directly to the virtual auxiliary storage device. The virtual main memory is a physical memory file storage unit 11, and is often loaded to main memory of the computer 1 and it is considered to enable high speed access. On the other hand, the virtual auxiliary storage device is the file storage unit 12, generally being an auxiliary storage device (not shown in the drawings) of the computer 1, for example, a hard disk drive, and only low speed access is possible. For this reason, when data is written directly to the virtual auxiliary storage device directly, it is expected that considerable time is required.

Furthermore, step S122 and step S123 are reversed, and after setting the disk cache to non-usage, implementation of the synchronization processing may be carried out.

This is for the following reason. According to the computer 1, in execution of a process to set the disk cache to be unused, after executing the synchronization processing, there may be cases where it cannot be guaranteed that there will be no writing to the virtual auxiliary storage device between executions of the two processes. In such a case, execution of the synchronization processing is performed after execution of the processing to set the disk cache to be unused.

Next, a description is given concerning an effect of the present exemplary embodiment, different from an effect of the first exemplary embodiment described above.

In the present exemplary embodiment, during execution of hibernation of the virtual machine, since the synchronization processor 154 writes back dirty pages, among the cache pages, to the file storage unit 12, after completion of hibernation of the virtual machine, there is no need for the attribute check unit 161 to write back the cache pages. For this reason, there is an effect in that it is possible to reduce computer resources such as CPU time and main memory necessary for write back processing after completion of the hibernation.

First Specific Example

Next, as a first specific example, a description is given of a specific configuration where the first exemplary embodiment of the present invention is applied to a computer in which Linux (registered trademark) is installed as an OS.

Figure 10:
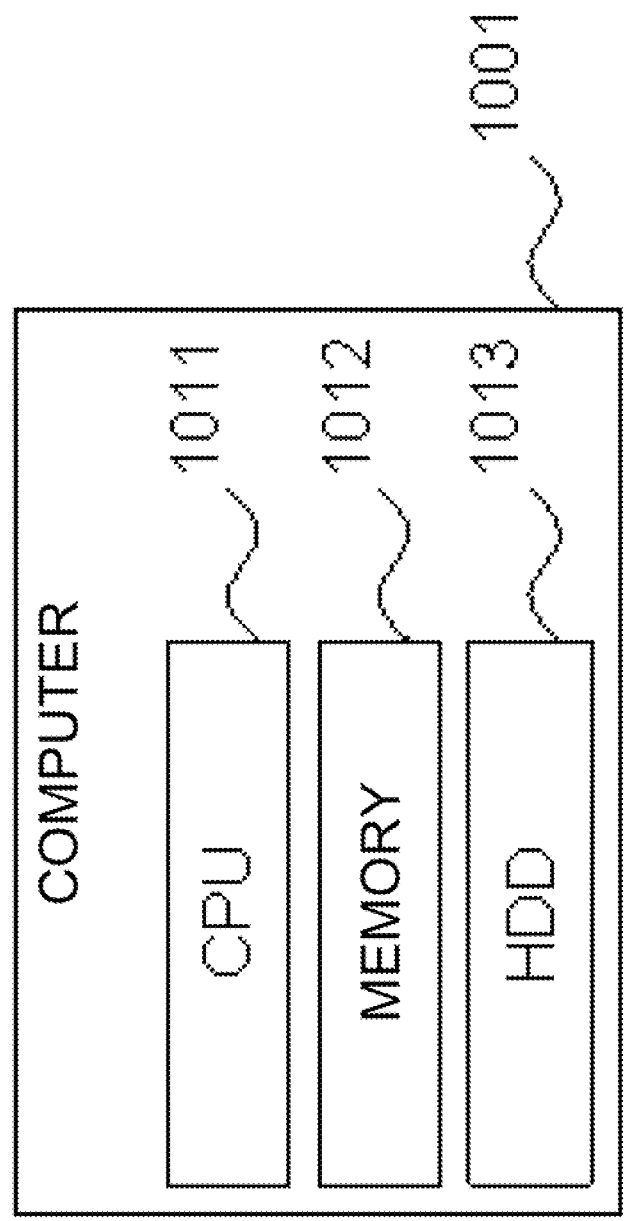
FIG. 10 is a configuration example of a computer to which the present invention can be applied.

As shown in FIG. 10, the computer 1001 is configured from a CPU 1011, a memory 1012, and a hard disk drive (below, HDD) 1013.

As a physical memory file storage unit 11, a file storage unit 12, a physical memory file management table storage unit 17, and a file management table storage unit 18 of the abovementioned first exemplary embodiment, the configuration uses the memory 1012 and the HDD 1213.

In general, since contents of the physical memory file storage unit 11, the physical memory file management table storage unit 17, and the file management table storage unit 18 are frequently accessed, or are loaded by computer programs using them, they are often stored in the memory 1012; since content of the file storage unit 12 is hardly accessed, it is often stored in the HDD 1013. Contents of these four storage units are implemented as files, and it is clear to a person skilled in the field as to how the files are stored in the memory 1012 or the HDD 1013.

Figure 11:
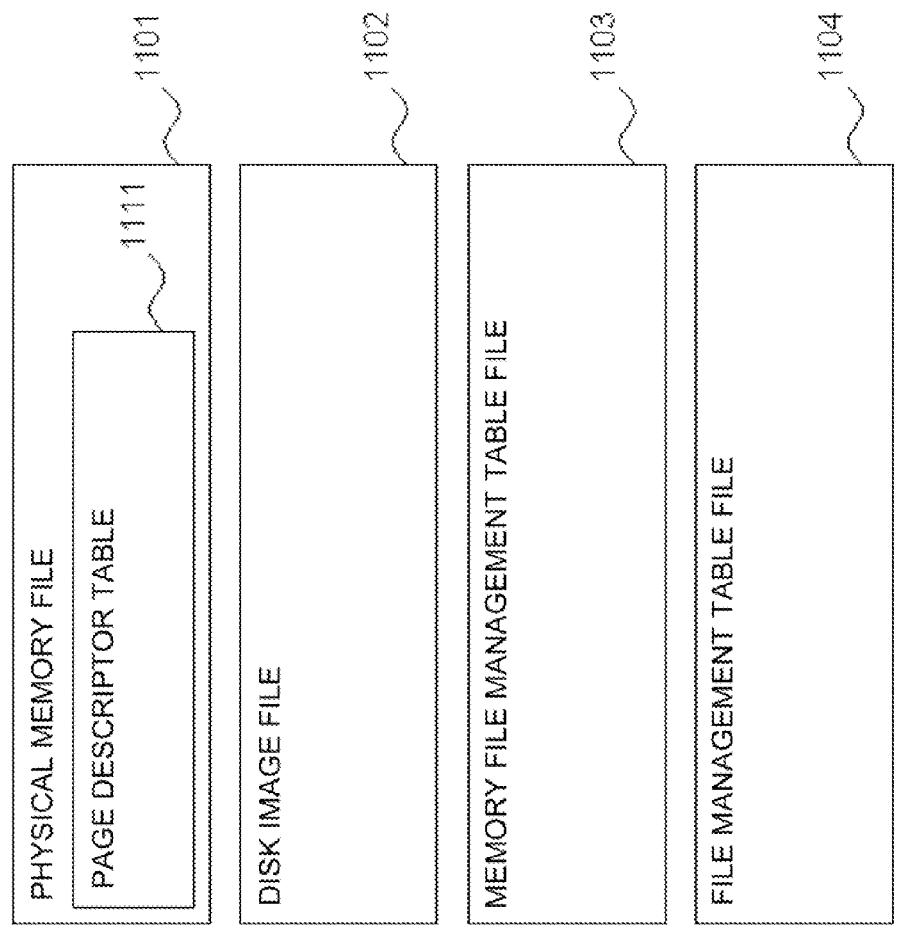
FIG. 11 is a diagram representing a file configuration for describing a specific example corresponding to the first exemplary embodiment of the present invention.

FIG. 11 is a diagram representing a configuration of the abovementioned four files. A physical memory file 1101 is a file corresponding to a physical memory file stored in the physical memory file storage unit 11. In the physical memory file 1101 there is a page descriptor table 1111 corresponding to the page management table stored in the page management table storage unit 111.

The page descriptor table 1111 is an array in which are placed page descriptors of Linux 1211 inside a virtual machine to be described later. It is to be noted that this table preferably has one member added to a normal Linux page descriptor. In a case where the page in question is a cache page, the member shows a value of an i node of a file having data cached by the abovementioned page. In a normal Linux page descriptor, in order to refer to the value of an i node of the file, it is necessary to follow a pointer from the page descriptor and refer to a plurality of objects. In order to follow the pointer, it is necessary to refer to other page tables (not shown in the drawings) stored in the physical memory file 1101, and the processing is complicated. As a result, it is desirable to be able to refer to the value of the i node of the file directly, by the page descriptor.

A disk image file 1102 is a file corresponding to a disk image file stored in the file storage unit 12.

A memory file management table file 1103 is a file corresponding to a physical memory file management table stored in the physical memory file management table storage unit 17, and at least stores an address within the physical memory file 1101, of the page descriptor table 1111.

A file management table file 1104 is a file corresponding to a file management table stored in the file management table storage unit 18, and associates an "i node number" and a "file name including path".

Figure 12:
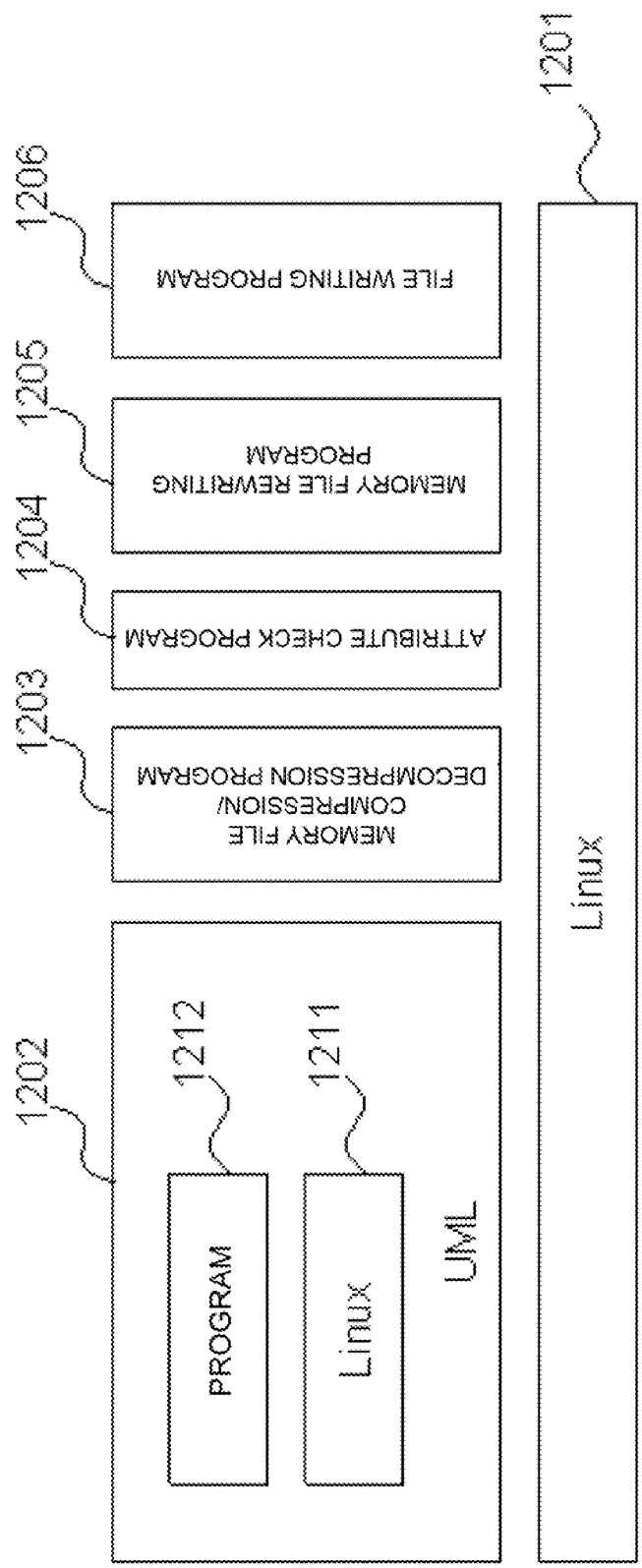
FIG. 12 is a diagram representing a computer program configuration for describing a specific example corresponding to the first exemplary embodiment of the present invention.

FIG. 12 shows a computer program configuration for realizing an operation after a hibernation transition described in the abovementioned first exemplary embodiment.

Referring to FIG. 12, user programs 1202 to 1206, including a virtual machine, and Linux 1201, which is an OS that runs these user programs, are shown. The user programs are: UML 1202, a memory file compression/decompression program 1203, an attribute check program 1204, a memory file conversion program 1205, and a file writing program 1206.

The UML 1202 is User Mode Linux (below, UML) used as the virtual machine 15. The UML 1202 is configured from Linux 1211 as the OS, and a program 1212 that is a user program operating inside the UML 1202. The UML 1202 is UML to which a hibernation function is added, and in the main flow of the hibernation, the program 1212 operating inside the UML is stopped, program information is stored, the kernel is stopped, and finally data of the main memory is stored. As the UML that performs these operations, Scrapbook UML has been proposed. Furthermore, Linux 1211 is Linux version 2.4.

A memory management mechanism and a file management mechanism of Linux 1211 are used as a memory management unit 152 and a file management unit 153 included in the OS 151 of the first exemplary embodiment. However, an attribute check unit 161 and a file writing unit 163 are reorganized so as to obtain desired memory management information or file management information.

For example, in a case of the abovementioned memory management mechanism, by a process of initializing a memory map, a virtual physical address of a start portion of an array in which page descriptors are placed and the size of the array may be reorganized so as to write to a memory file management table file 1103 described later.

In the same way, in a case of the abovementioned file management mechanism for example, in a file open process, reorganization may be done to search for a file from the "file name including path", to specify the "i node number", and to write a result thereof to the file management table file 1104.

Furthermore, according to necessity, for example, desired memory management information or file management information is transmitted to a program (not shown in the drawings) in Linux 1201, by inter-process communication, from the memory management mechanism or the file management mechanism described above, and the program may be implemented so as to write to the memory file management table file 1103 or the file management table file 1104.

The memory file compression/decompression program 1203 corresponds to a memory file compression unit 13 and a memory file decompression unit 14. The memory file compression/decompression program 1203 may be gzip, which is a general compression/decompression program installed in Linux.

The attribute check program 1204 is a program that operates in Linux 1201, corresponding to the attribute check unit 161. The attribute check program 1204, after the UML 1202 transitions to a hibernation state, performs mapping of the physical memory file 1101 to a memory 1012 by a function such as mmap. At this time, by mapping at the same address as when the UML 1202 is mapped, a virtual physical address of the UML 1202 can be used as it is.

The abovementioned attribute check program 1204 refers to the page descriptor table 1111 based on content of the memory file management table file 1103. Furthermore, referring to a member of the page descriptor for each memory page, if a member "count", which is a reference counter, is 0, since the page in question is an empty page, rewriting of the page in question is requested to the memory file rewriting program 1205. In a case where "count" is larger than 0 and the member "mapping" is not NULL, the page in question is a cache page. In a case where the page in question is a cache page and a flag of a member "flags" is shown not to be a dirty, since data the same as data of the page in question is present also in the disk image file 1102, a request is made to the memory file rewriting program 1205 to rewrite the page in question. Conversely, in a case where the page in question is a cache page and the flag of the member "flags" is shown to be a dirty, since data of the page in question must be written back to the disk image file 1102, after writing back the data of the page in question to the file writing program 1206, a request is made to rewrite the page in question, to the memory file rewriting program 1205. After rewriting of the page in question is completed, the attribute check program 1204 sets the member of the page descriptor to an initial value.

The memory file rewriting program 1205 is a program that operates in Linux 1201, corresponding to a physical memory file rewriting processor 162. The memory file rewriting program 1205 rewrites content of the physical memory file 1101, in response to a request of the attribute check program 1204.

The file writing program 1206 is a program that operates in Linux 1201, corresponding to the file writing unit 163. The file writing program 1206, by loopback mounting the disk image file 1102, can operate on content thereof. Furthermore, in a case where there are plural disk image files 1102 present, mounting is performed matching a configuration of a virtual auxiliary storage device of the UML 1202. The file writing program 1206, after mounting the disk image file 1102, in response to a request of the attribute check program 1204, writes data of a memory page indicated by the physical memory file 1101 to the disk image file 1102. With regard to a write back position inside the disk image file 102, based on an "i node number" transmitted from the attribute check program 1204, by making reference to the file management table file 1104 and obtaining the "file name including path" from the "i node number", the file that is targeted is identified, and in addition, based on the value of a member "index" transmitted from the attribute check program 1204, the position is determined by identifying a position inside the file.

Operation of the abovementioned first specific example is the same as the first exemplary embodiment described above, and since component elements corresponding to the component elements of the first exemplary embodiment described above operate in the same way, a description thereof is omitted.

Second Specific Example

Next, as a second specific example, a description is given of a specific configuration where the second exemplary embodiment of the present invention is applied to a computer in which Linux (registered trademark) is installed as an OS.

Since the configuration of the abovementioned computer is the same as the first specific example shown in FIG. 10, a description thereof is omitted.

Figure 13:
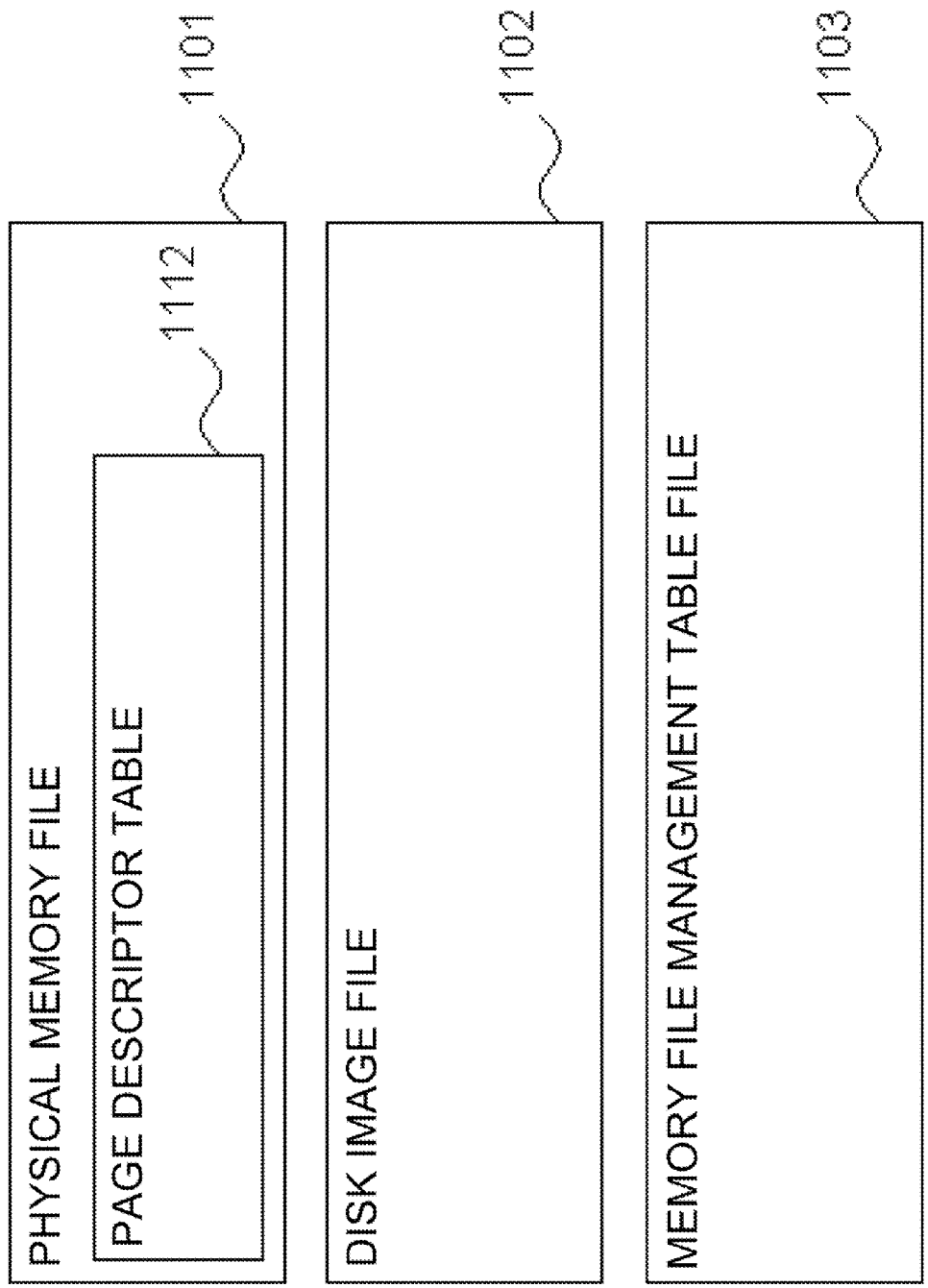
FIG. 13 is a diagram representing a file configuration for describing a specific example corresponding to the second exemplary embodiment.

FIG. 13 is a diagram representing a configuration of a file used by the computer of the second specific example. In particular, compared to FIG. 11, a file management table file 1104 is unnecessary. Furthermore, in an example shown in FIG. 11, a page descriptor table is different, and the page descriptor table 1112 forms an array in which are placed page descriptors of Linux 1213 inside a virtual machine to be described later. Moreover, in the second specific example, since there is no writing back of cache pages after completion of hibernation of UML 1207, page descriptor reorganization is not necessary.

Figure 14:
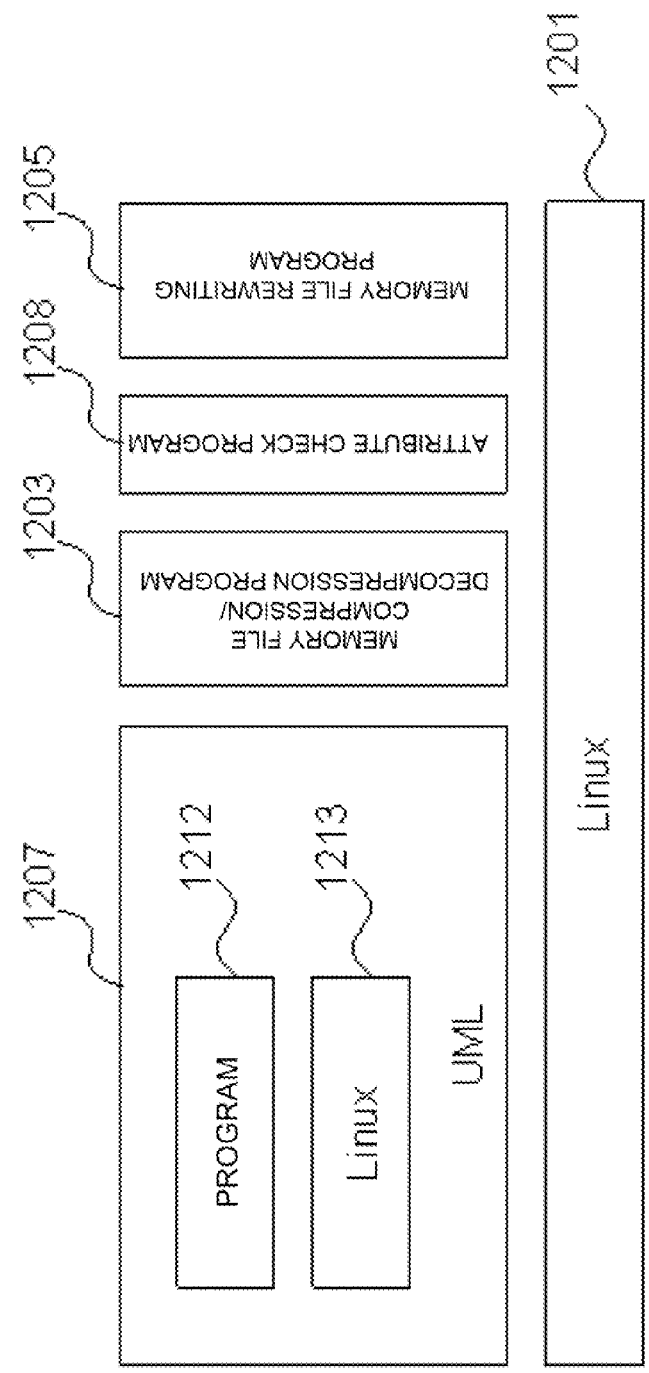
FIG. 14 is a diagram representing a computer program configuration for describing a specific example corresponding to the second exemplary embodiment of the present invention.
Figure 15:
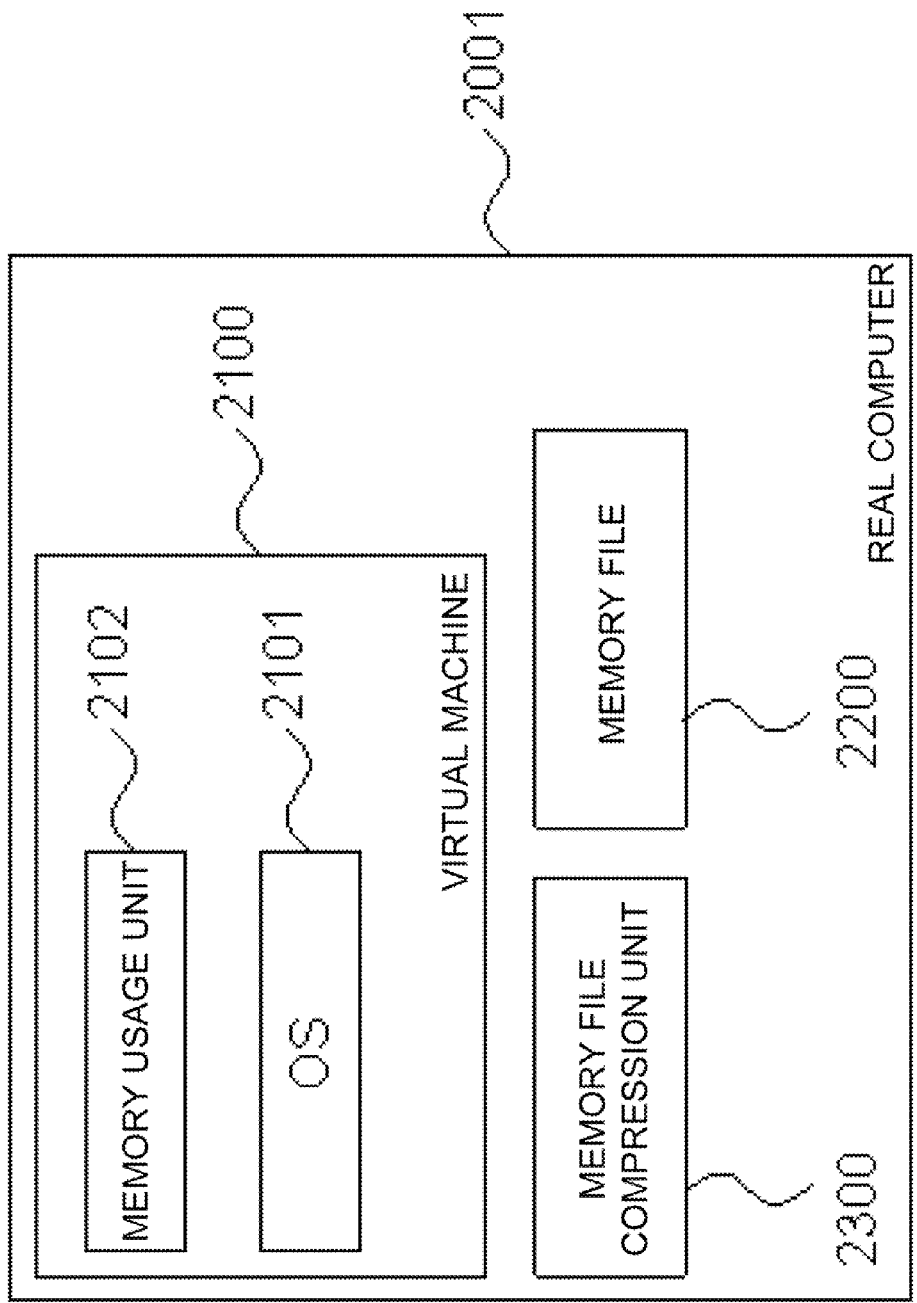
FIG. 15 is a block diagram showing a configuration of Non-Patent Document 1.
Figure 16:
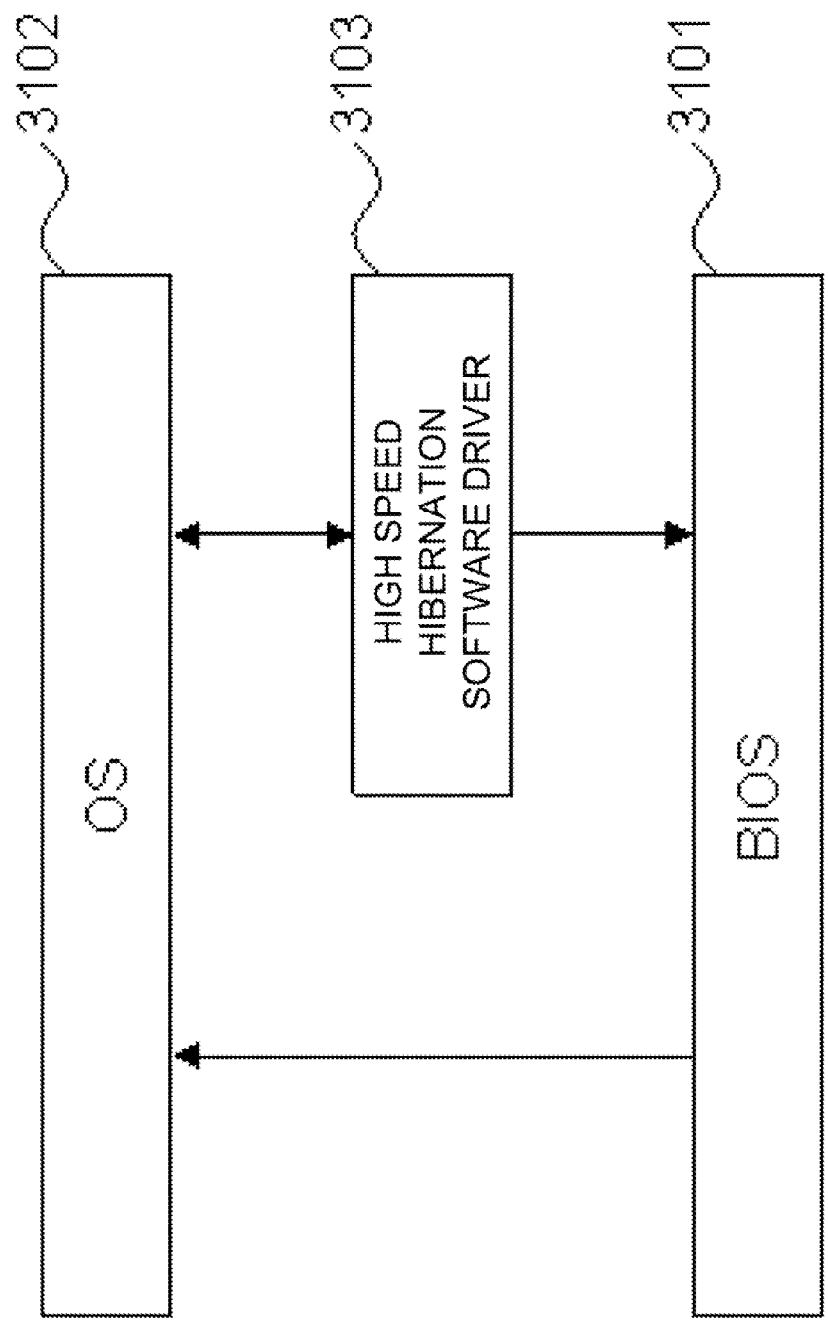
FIG. 16 is a block diagram showing a configuration of Patent Document 1.

FIG. 14 shows a computer program configuration for realizing an operation during hibernation execution and after hibernation described in the abovementioned second exemplary embodiment.

The configuration of the program of FIG. 14 is a configuration in which a file writing program 1206 is removed from the program configuration of the first specific example shown in FIG. 12.

Furthermore, Linux 1213, obtained by reorganizing the program configuration Linux 1211 of the first specific example shown in FIG. 12, is installed, and therefore a reference numeral for UML is changed to be represented as UML 1207.

Linux 1213 is Linux reconfigured so as to execute writing back to a disk image file 1102 of dirty cache pages during hibernation execution, with respect to Linux 1211.

More specifically, Linux 1213 executes processing similar to sync, which is a system call for synchronizing cache pages, after starting execution of hibernation. Furthermore, after completion of this synchronization, Linux 1213 executes write processing that does not forcibly use disk cache. As methods for this processing, for example, a method of executing write processing that does not forcibly use disk cache when writing a file, in a generic_file_write function, which is a general write method, or a method of setting a flag that does not use disk cache, in a member "f_flags" of an entire file structure body.

In this way, after execution of synchronization, disk cache is not used when writing, and writing to a file is performed directly for a file. It is to be noted that, in a case of the latter method, it is necessary to store a value of "f_flags" before setting and to re-set at a time of resuming.

Operation of the abovementioned second specific example is the same as the second exemplary embodiment described above, and since component elements corresponding to the component elements of the second exemplary embodiment described above operate in the same way, a description thereof is omitted.

Descriptions have been given above of preferred exemplary embodiments of the present invention, but the present invention is not limited to the abovementioned exemplary embodiments, and further modifications, substitutions, and adjustments can be added within bounds that do not depart from fundamental technological concepts of the present invention. For example, various types of modification can be added with respect to configurations and flowcharts shown in the abovementioned exemplary embodiments and specific examples, in accordance with specifications and applications of the present computer system.

INDUSTRIAL APPLICABILITY

The present invention can be applied to usage in a virtual machine management system being able to transit to a hibernation state and in which a plurality of virtual machines are stored in one real computer. Furthermore, applications are possible to a virtual machine transfer system in which virtual machines are transferred via a network.

In the following, preferred modes are summarized.

Mode 1

A computer system that can configure a virtual machine having a hibernation function, the system comprising a physical memory file rewriting processor for rewriting a physical memory file that stores data of a virtual main memory of the virtual machine, so as to enable reduction of data stored in an auxiliary storage device, after the virtual machine transitions to a hibernation state.

Mode 2

The computer system according to mode 1, wherein a check is performed on an attribute of a memory page included in the physical memory file, after the virtual machine transitions to a hibernation state, in order to rewrite the physical memory file.

Mode 3

The computer system according to mode 2, wherein, as a result of the check, in a case where a discardable memory page is detected, the memory page is rewritten to data suitable for compression, and the physical memory file is compressed.

Mode 4

The computer system according to mode 2, wherein, as a result of the check, in a case where a discardable memory page is detected, the memory page is deleted.

Mode 5

The computer system according to mode 4, wherein a physical memory file is decompressed by inserting, at a position of the deleted memory page, data of a similar number of pages as memory pages that have been deleted.

Mode 6

The computer system according to mode 4, wherein a physical memory file, in which the memory page has been deleted, is compressed.

Mode 7

A computer system configured by a real computer that can configure a virtual machine having a hibernation function, the system comprising:

a physical memory file management table storage unit for storing an address of a page management table in which an attribute of a memory page of a virtual main memory of the virtual machine is set;

a memory management unit for managing the virtual main memory of the virtual machine, and furthermore for recording an address inside the virtual main memory of the page management table in the physical memory file management table storage unit;

an attribute check unit for referring to the page management table based on an address recorded in the physical memory file management table storage unit, after the virtual machine transitions to a hibernation state, and for checking whether or not there is a discardable memory page from an attribute of a memory page set in the page management table;

a physical memory file rewriting processor for rewriting the memory page in a format suitable for compression, in a case where the attribute check unit has detected a discardable memory page; and a physical memory file compression unit for compressing a physical memory file after the check and the rewriting have all been completed.

Mode 8

A computer system configured by a real computer that can configure a virtual machine having a hibernation function, the system comprising:

a physical memory file management table storage unit for storing an address of a page management table in which an attribute of a memory page of a virtual main memory of the virtual machine is set;

a memory management unit for managing the virtual main memory of the virtual machine, and furthermore for recording an address inside the virtual main memory of the page management table in the physical memory file management table storage unit;

an attribute check unit for referring to the page management table based on an address recorded in the physical memory file management table storage unit, after the virtual machine transitions to a hibernation state, and for checking whether or not there is a discardable memory page from an attribute of a memory page set in the page management table; and a physical memory file rewriting processor for deleting the memory page, in a case where the attribute check unit has detected a discardable memory page.

Mode 9

The computer system according to mode 8, further comprising a physical memory file compression unit for compressing a physical memory file, after the check and the deleting have all been completed.

Mode 10

The computer system according to mode 7 or 8, further comprising:

a file management table storage unit for storing a relationship of an identification code of a file included in a virtual auxiliary storage device of the virtual machine and a path within the virtual auxiliary storage device;

a file management unit for managing the virtual auxiliary storage device of the virtual machine during operation of the virtual machine, and recording the relationship of the identification code and path of the file, in the file management table storage unit; and a file writing unit for detecting a file corresponding to the memory page, based on content of the file management table storage unit, in a case where data of a memory page judged to be a discardable memory page by the attribute check unit and data of a file corresponding to the memory page are different, and for writing back data of the memory page to the detected file.

Mode 11

The computer system according to mode 7 or 8, further comprising:

a synchronization processor for synchronizing data of a discardable memory page and data of a file corresponding to the memory page, from an arbitrary point in time before the virtual machine completes hibernation; and a file processor set so as not to use a memory page, when writing to a file after the synchronization.

Mode 12

The computer system according to mode 7 or 8, comprising:

a file processor set so as not to use a memory page, when writing to a file, from an arbitrary point in time before the virtual machine has completed hibernation; and a synchronization processor for synchronizing data of a discardable memory page, after the setting, and data of a file corresponding to the memory page.

Mode 13

(refer to the data storage method of the second aspect)

Mode 14

The data storage method according to mode 13, comprising: checking an attribute of a memory page included in the physical memory file, after the virtual machine transitions to a hibernation state, in order to rewrite the physical memory file.

Mode 15

The data storage method according to mode 14, comprising: as a result of the check, rewriting the memory page to data suitable for compression, in a case where a discardable memory page is detected, and compressing the physical memory file.

Mode 16

The data storage method according to mode 14, comprising: as a result of the check, deleting the memory page, in a case where a discardable memory page is detected.

Mode 17

The data storage method according to mode 16, comprising: for a physical memory file rewritten according to the data storage method, decompressing a physical memory file by inserting data of a similar number of pages as memory pages that have been deleted, at a position of the deleted memory pages.

Mode 18

The data storage method according to mode 16, comprising:

compressing a physical memory file in which the memory page is deleted.

Mode 19

A data storage method for storing data included in a physical memory file that stores data of a virtual main memory of a virtual machine, the method comprising:

setting, in a real computer in which the virtual machine is operating, an attribute of a memory page of the virtual main memory of the virtual machine, in a page management table, by an operating system (referred to below as OS) included in the virtual machine, and managing the virtual main memory of the virtual machine, recording an address inside the virtual main memory of the page management table in a physical memory file management table storage unit, referring to the page management table based on the address recorded in the physical memory file management table storage unit, after the virtual machine transitions to a hibernation state, and checking whether or not there is a discardable memory page from an attribute of the memory page set in the page management table, rewriting, in a case where a discardable memory page is detected, the memory page to data suitable for compression, and compressing the physical memory file, after the check and the rewriting have all been completed.

Mode 20

A data storage method for storing data included in a physical memory file that stores data of a virtual main memory of a virtual machine, the method comprising:

setting, in a real computer in which the virtual machine is operating, an attribute of a memory page of the virtual main memory of the virtual machine, in a page management table, by an OS included in the virtual machine, and managing the virtual main memory of the virtual machine, recording an address inside the virtual main memory of the page management table in a physical memory file management table storage unit, referring to the page management table based on the address recorded in the physical memory file management table storage unit, after the virtual machine transitions to a hibernation state, and checking whether or not there is a discardable memory page from an attribute of the memory page set in the page management table, and deleting, in a case where a discardable memory page is detected, the memory page.

Mode 21

The data storage method according to mode 20, comprising compressing a physical memory file, after the check and the deleting have all been completed.

Mode 22

The data storage method according to mode 19 or 20, comprising:

managing, by the OS, a virtual auxiliary storage device of the virtual machine during operation of the virtual machine, and recording information of a relationship of an identification code of a file included in the auxiliary storage device and a path in the virtual auxiliary storage device of the file, in a file management table storage unit, detecting a file corresponding to the memory page, based on content of the file management table storage unit, in a case where data of a memory page judged to be a discardable memory page by the check, and data of a file corresponding to the memory page, are different, and writing back data of the memory page to the detected file.

Mode 23

The data storage method according to mode 19 or 20, comprising:

synchronizing data of a discardable memory page and data of a file corresponding to the memory page, from an arbitrary point in time before the virtual machine has completed hibernation, and setting a memory page so as not be used, when writing to a file after the synchronization.

Mode 24

The data storage method according to mode 19 or 20, comprising:

setting a memory page so as not be used, when writing to a file, from an arbitrary point in time before the virtual machine has completed hibernation, and after the setting, synchronizing data of a discardable memory page and data of a file corresponding to the memory page.

Mode 25

(refer to the computer program of the third aspect)

Mode 26

The computer program according to mode 25, for executing on a real computer a process of checking an attribute of a memory page included in the physical memory file, after the virtual machine transitions to a hibernation state, in order to rewrite the physical memory file.

Mode 27

The computer program according to mode 26, for executing on a real computer, as a result of the check, a process of rewriting the memory page to data suitable for compression, in a case where a discardable memory page is detected, and compressing the physical memory file.

Mode 28

The computer program according to mode 26, for executing on a real computer, as a result of the check, in a case where a discardable memory page is detected, a process of deleting the memory page.

Mode 29

The computer program according to mode 28, for executing on a real computer a process of decompressing a physical memory file, by inserting data in a similar number of pages as the memory pages that have been deleted, at a position of the deleted memory pages.

Mode 30

The computer program according to mode 28, for executing on a real computer a process of compressing a physical memory file in which the memory page has been deleted.

Mode 31

A computer program for storing data included in a physical memory file that stores data of a virtual main memory of a virtual machine, the program operating in a real computer and executing, in an OS for managing the virtual main memory of the virtual machine:

a process of setting an attribute of a memory page of the virtual main memory of the virtual machine, in a page management table, a process of recording an address inside the virtual main memory of the page management table in a physical memory file management table storage unit, a process of referring to the page management table based on the address of the page management table recorded in the physical memory file management table storage unit, after the virtual machine transitions to a hibernation state, and checking whether or not there is a discardable memory page from an attribute of the memory page set in the page management table, a process of rewriting, in a case where a discardable memory page is detected, the memory page to data suitable for compression, and a process of compressing the physical memory file, after the check and the rewriting have all been completed.

Mode 32

A program for storing data included in a physical memory file that stores data of a virtual main memory of a virtual machine, the program operating in a real computer and executing, in an OS for managing the virtual main memory of the virtual machine:

a process of setting an attribute of a memory page of the virtual main memory of the virtual machine, in a page management table, a process of recording an address inside the virtual main memory of the page management table in a physical memory file management table storage unit, a process of referring to the page management table based on the address recorded in the physical memory file management table storage unit, after the virtual machine transitions to a hibernation state, and checking whether or not there is a discardable memory page from an attribute of the memory page set in the page management table, and a process of deleting the memory page, in a case where a discardable memory page is detected.

Mode 33

The program according to mode 32, further executing in a real computer a process of compressing a physical memory file, after the check and the deleting have all been completed.

Mode 34

The program according to mode 31 or 32, for executing in a real computer:

a process of managing in the OS a virtual auxiliary storage device of the virtual machine during operation of the virtual machine, and recording information of a relationship of an identification code of a file included in the auxiliary storage device and a path in the virtual auxiliary storage device of the file, in a file management table storage unit, and a process of detecting a file corresponding to the memory page, based on content of the file management table storage unit, in a case where data of a memory page judged to be a discardable memory page by the check, and data of a file corresponding to the memory page, are different, and writing back data of the memory page to the detected file.

Mode 35

The program according to mode 31 or 32, for executing on a real computer:

a process of synchronizing data of a discardable memory page and data of a file corresponding to the memory page, from an arbitrary point in time before the virtual machine completes hibernation, and a process of setting a memory page so as not be used, when writing to a file after the synchronization.

Mode 36

The program according to mode 31 or 32, for executing on a real computer, a process of setting a memory page so as not be used, when writing to a file, from an arbitrary point in time before the virtual machine has completed hibernation, and a process, after the setting, of synchronizing data of a discardable memory page and data of a file corresponding to the memory page.

It is to be noted that the various disclosures of the above-mentioned Patent Documents are incorporated herein by reference thereto. Modifications and adjustments of embodiments and examples are possible within the bounds of the entire disclosure (including the scope of the claims) of the present invention, and also based on fundamental technological concepts thereof. Furthermore, a wide variety of combinations and selections of various disclosed elements are possible within the scope of the claims of the present invention. That is, the present invention clearly includes every type of transformation and modification that a person skilled in the field can realize according to the entire disclosure including the scope of the claims and to technological concepts thereof.

EXPLANATIONS OF SYMBOLS 1 computer
11 physical memory file storage unit
12 file storage unit
13 memory file compression unit
14 memory file decompression unit
15 virtual machine
16 virtual machine monitoring unit
17 physical memory file management table storage unit
18 file management table storage unit
111 page management table storage unit
151 OS
152 memory management unit
153 file management unit
154 synchronization processor
161 attribute check unit
162 physical memory file rewriting processor
163 file writing unit
1001 computer
1011 CPU
1012 memory
1013 HDD
1101 physical memory file
1102 disk image file
1103 memory file management table file
1104 file management table file
1111 page descriptor table
1201 Linux
1202, 1207 UML
1203 memory file compression/decompression program
1204 attribute check program
1205 memory file rewriting program
1206 file writing program
1211, 1213 Linux
1212 program
2001 real computer
2100 virtual machine
2101 OS
2102 memory usage part
2200 memory file
2300 memory file compression unit
3101 BIOS
3102 OS
3103 high speed hibernation software driver

What is claimed is:

1. A computer system that can configure a virtual machine being able to transit to a hibernation state, said system comprising a physical memory file rewriting processor for rewriting a physical memory file that stores data of a virtual main memory of said virtual machine, so as to enable reduction of data stored in an auxiliary storage device, after said virtual machine transitions to a hibernation state.

2. The computer system according to claim 1, wherein a check is performed on an attribute of a memory page included in said physical memory file, after said virtual machine transitions to a hibernation state, in order to rewrite said physical memory file.

3. The computer system according to claim 2, wherein, as a result of said check, in a case where a discardable memory page is detected, said memory page is rewritten to data suitable for compression, and said physical memory file is compressed.

4. The computer system according to claim 2, wherein, as a result of said check, in a case where a discardable memory page is detected, said memory page is deleted.

5. The computer system according to claim 4, wherein a physical memory file is decompressed by inserting, at a position of said deleted memory page, data of a similar number of pages as memory pages that have been deleted.

6. The computer system according to claim 4, wherein a physical memory file, in which said memory page has been deleted, is compressed.

7. A computer system configured by a real computer that can configure a virtual machine being able to transit to a hibernation state, said system comprising:

a physical memory file management table storage unit for storing an address of a page management table in which an attribute of a memory page of a virtual main memory of said virtual machine is set;

a memory management unit for managing the virtual main memory of said virtual machine, and furthermore for recording an address inside said virtual main memory of said page management table in said physical memory file management table storage unit;

an attribute check unit for referring to said page management table based on an address recorded in said physical memory file management table storage unit, after said virtual machine transitions to a hibernation state, and for checking whether or not there is a discardable memory page from an attribute of a memory page set in said page management table;

a physical memory file rewriting processor for rewriting said memory page in a format suitable for compression, in a case where said attribute check unit has detected a discardable memory page; and a physical memory file compression unit for compressing a physical memory file after said check and said rewriting have all been completed.

8. The computer system according to claim 7, further comprising:
- a file management table storage unit for storing a relationship of an identification code of a file included in a virtual auxiliary storage device of said virtual machine and a path within said virtual auxiliary storage device;
- a file management unit for managing the virtual auxiliary storage device of said virtual machine during operation of said virtual machine, and recording the relationship of the identification code and path of said file, in said file management table storage unit; and
- a file writing unit for detecting a file corresponding to said memory page, based on content of said file management table storage unit, in a case where data of a memory page judged to be a discardable memory page by said attribute check unit and data of a file corresponding to said memory page are different, and for writing back data of said memory page to said detected file.

9. The computer system according to claim 7, further comprising:
- a synchronization processor for synchronizing data of a discardable memory page and data of a file corresponding to said memory page, from an arbitrary point in time before said virtual machine completes hibernation; and
- a file processor set so as not to use a memory page, when writing to a file after said synchronization.

10. The computer system according to claim 7, comprising:
- a file processor set so as not to use a memory page, when writing to a file, from an arbitrary point in time before said virtual machine has completed hibernation; and
- a synchronization processor for synchronizing data of a discardable memory page, after said setting, and data of a file corresponding to said memory page.

11. A computer system configured by a real computer that can configure a virtual machine being able to transit to a hibernation state, said system comprising:
- a physical memory file management table storage unit for storing an address of a page management table in which an attribute of a memory page of a virtual main memory of said virtual machine is set;
- a memory management unit for managing the virtual main memory of said virtual machine, and furthermore for recording an address inside said virtual main memory of said page management table in said physical memory file management table storage unit;
- an attribute check unit for referring to said page management table based on an address recorded in said physical memory file management table storage unit, after said virtual machine transitions to a hibernation state, and for checking whether or not there is a discardable memory page from an attribute of a memory page set in said page management table; and
- a physical memory file rewriting processor for deleting said memory page, in a case where said attribute check unit has detected a discardable memory page.

12. The computer system according to claim 11, further comprising a physical memory file compression unit for compressing a physical memory file, after said check and said deleting have all been completed.

13. The computer system according to claim 11, further comprising:
- a file management table storage unit for storing a relationship of an identification code of a file included in a virtual auxiliary storage device of said virtual machine and a path within said virtual auxiliary storage device;
- a file management unit for managing the virtual auxiliary storage device of said virtual machine during operation of said virtual machine, and recording the relationship of the identification code and path of said file, in said file management table storage unit; and
- a file writing unit for detecting a file corresponding to said memory page, based on content of said file management table storage unit, in a case where data of a memory page judged to be a discardable memory page by said attribute check unit and data of a file corresponding to said memory page are different, and for writing back data of said memory page to said detected file.

14. The computer system according to claim 11, further comprising:
- a synchronization processor for synchronizing data of a discardable memory page and data of a file corresponding to said memory page, from an arbitrary point in time before said virtual machine completes hibernation; and
- a file processor set so as not to use a memory page, when writing to a file after said synchronization.

15. The computer system according to claim 11, comprising:
- a file processor set so as not to use a memory page, when writing to a file, from an arbitrary point in time before said virtual machine has completed hibernation; and
- a synchronization processor for synchronizing data of a discardable memory page, after said setting, and data of a file corresponding to said memory page.

16. A data storage method for storing data included in a physical memory file that stores data of a virtual main memory of a virtual machine, said method comprising rewriting said physical memory file, so as to enable reduction of data stored in an auxiliary storage device, after said virtual machine transitions to a hibernation state.

17. The data storage method according to claim 16, comprising: checking an attribute of a memory page included in said physical memory file, after said virtual machine transitions to a hibernation state, in order to rewrite said physical memory file.

18. The data storage method according to claim 17, comprising: as a result of said check, rewriting said memory page to data suitable for compression, in a case where a discardable memory page is detected, and compressing said physical memory file.

19. The data storage method according to claim 17, comprising: as a result of said check, deleting said memory page, in a case where a discardable memory page is detected.

20. The data storage method according to claim 19, comprising: for a physical memory file rewritten according to said data storage method, decompressing a physical memory file by inserting data of a similar number of pages as memory pages that have been deleted, at a position of said deleted memory pages.

21. The data storage method according to claim 19, comprising: compressing a physical memory file in which said memory page is deleted.

22. A data storage method for storing data included in a physical memory file that stores data of a virtual main memory of a virtual machine, said method comprising:
- setting, in a real computer in which said virtual machine is operating, an attribute of a memory page of the virtual main memory of said virtual machine, in a page management table, by an operating system (referred to below as OS) included in said virtual machine, and managing the virtual main memory of said virtual machine, recording an address inside the virtual main memory of said page management table in a physical memory file management table storage unit, referring to said page management table based on the address recorded in said physical memory file management table storage unit, after said virtual machine transitions to a hibernation state, and checking whether or not there is a discardable memory page from an attribute of the memory page set in said page management table, rewriting, in a case where a discardable memory page is detected, said memory page to data suitable for compression, and compressing said physical memory file, after said check and said rewriting have all been completed.

23. The data storage method according to claim 22, comprising:

managing, by said OS, a virtual auxiliary storage device of said virtual machine during operation of said virtual machine, and recording information of a relationship of an identification code of a file included in said auxiliary storage device and a path in the virtual auxiliary storage device of said file, in a file management table storage unit, detecting a file corresponding to said memory page, based on content of said file management table storage unit, in a case where data of a memory page judged to be a discardable memory page by said check, and data of a file corresponding to said memory page, are different, and writing back data of said memory page to said detected file.

24. The data storage method according to claim 22, comprising:

synchronizing data of a discardable memory page and data of a file corresponding to said memory page, from an arbitrary point in time before said virtual machine has completed hibernation, and setting a memory page so as not be used, when writing to a file after said synchronization.

25. The data storage method according to claim 22, comprising:

setting a memory page so as not be used, when writing to a file, from an arbitrary point in time before said virtual machine has completed hibernation, and after said setting, synchronizing data of a discardable memory page and data of a file corresponding to said memory page.

26. A data storage method for storing data included in a physical memory file that stores data of a virtual main memory of a virtual machine, said method comprising:

setting, in a real computer in which said virtual machine is operating, an attribute of a memory page of the virtual main memory of said virtual machine, in a page management table, by an OS included in said virtual machine, and managing the virtual main memory of said virtual machine, recording an address inside the virtual main memory of said page management table in a physical memory file management table storage unit, referring to said page management table based on the address recorded in said physical memory file management table storage unit, after said virtual machine transitions to a hibernation state, and checking whether or not there is a discardable memory page from an attribute of the memory page set in said page management table, and deleting, in a case where a discardable memory page is detected, said memory page.

27. The data storage method according to claim 26, comprising compressing a physical memory file, after said check and said deleting have all been completed.

28. The data storage method according to claim 26, comprising:

managing, by said OS, a virtual auxiliary storage device of said virtual machine during operation of said virtual machine, and recording information of a relationship of an identification code of a file included in said auxiliary storage device and a path in the virtual auxiliary storage device of said file, in a file management table storage unit, detecting a file corresponding to said memory page, based on content of said file management table storage unit, in a case where data of a memory page judged to be a discardable memory page by said check, and data of a file corresponding to said memory page, are different, and writing back data of said memory page to said detected file.

29. The data storage method according to claim 26, comprising:

synchronizing data of a discardable memory page and data of a file corresponding to said memory page, from an arbitrary point in time before said virtual machine has completed hibernation, and setting a memory page so as not be used, when writing to a file after said synchronization.

30. The data storage method according to claim 26, comprising:

setting a memory page so as not be used, when writing to a file, from an arbitrary point in time before said virtual machine has completed hibernation, and after said setting, synchronizing data of a discardable memory page and data of a file corresponding to said memory page.

31. A computer program for storing data included in a physical memory file that stores data of a virtual main memory of a virtual machine, said program executing on a real computer a process of rewriting said physical memory file so as to enable reduction of data stored in an auxiliary storage device, after said virtual machine transitions to a hibernation state.

32. The computer program according to claim 31, for executing on a real computer a process of checking an attribute of a memory page included in said physical memory file, after said virtual machine transitions to a hibernation state, in order to rewrite said physical memory file.

33. The computer program according to claim 32, for executing on a real computer, as a result of said check, a process of rewriting said memory page to data suitable for compression, in a case where a discardable memory page is detected, and compressing said physical memory file.

34. The computer program according to claim 32, for executing on a real computer, as a result of said check, in a case where a discardable memory page is detected, a process of deleting said memory page.

35. The computer program according to claim 34, for executing on a real computer a process of decompressing a physical memory file, by inserting data in a similar number of pages as the memory pages that have been deleted, at a position of said deleted memory pages.

36. The computer program according to claim 34, for executing on a real computer a process of compressing a physical memory file in which said memory page has been deleted.

37. A computer program for storing data included in a physical memory file that stores data of a virtual main memory of a virtual machine, said program operating in a real computer and executing, in an OS for managing the virtual main memory of said virtual machine:
- a process of setting an attribute of a memory page of the virtual main memory of said virtual machine, in a page management table,
- a process of recording an address inside the virtual main memory of said page management table in a physical memory file management table storage unit,
- a process of referring to said page management table based on the address of the page management table recorded in said physical memory file management table storage unit, after said virtual machine transitions to a hibernation state, and checking whether or not there is a discardable memory page from an attribute of the memory page set in said page management table,
- a process of rewriting, in a case where a discardable memory page is detected, said memory page to data suitable for compression, and
- a process of compressing said physical memory file, after said check and said rewriting have all been completed.

38. The computer program according to claim 37, for executing in a real computer:
- a process of managing in said OS a virtual auxiliary storage device of said virtual machine during operation of said virtual machine, and recording information of a relationship of an identification code of a file included in said auxiliary storage device and a path in the virtual auxiliary storage device of said file, in a file management table storage unit, and
- a process of detecting a file corresponding to said memory page, based on content of said file management table storage unit, in a case where data of a memory page judged to be a discardable memory page by said check, and data of a file corresponding to said memory page, are different, and writing back data of said memory page to said detected file.

39. The computer program according to claim 37, for executing on a real computer:
- a process of synchronizing data of a discardable memory page and data of a file corresponding to said memory page, from an arbitrary point in time before said virtual machine completes hibernation, and
- a process of setting a memory page so as not be used, when writing to a file after said synchronization.

40. The computer program according to claim 37, for executing on a real computer,
- a process of setting a memory page so as not be used, when writing to a file, from an arbitrary point in time before said virtual machine has completed hibernation, and
- a process, after said setting, of synchronizing data of a discardable memory page and data of a file corresponding to said memory page.

41. A computer program for storing data included in a physical memory file that stores data of a virtual main memory of a virtual machine, said program operating in a real computer and executing, in an OS for managing the virtual main memory of said virtual machine:
- a process of setting an attribute of a memory page of the virtual main memory of said virtual machine, in a page management table,
- a process of recording an address inside the virtual main memory of said page management table in a physical memory file management table storage unit,
- a process of referring to said page management table based on the address recorded in said physical memory file management table storage unit, after said virtual machine transitions to a hibernation state, and checking whether or not there is a discardable memory page from an attribute of the memory page set in said page management table, and
- a process of deleting said memory page, in a case where a discardable memory page is detected.

42. The computer program according to claim 41, further executing in a real computer a process of compressing a physical memory file, after said check and said deleting have all been completed.

43. A non-transitory computer-readable storage medium storing a program according to claim 41, for executing in a real computer:
- a process of managing in said OS a virtual auxiliary storage device of said virtual machine during operation of said virtual machine, and recording information of a relationship of an identification code of a file included in said auxiliary storage device and a path in the virtual auxiliary storage device of said file, in a file management table storage unit, and
- a process of detecting a file corresponding to said memory page, based on content of said file management table storage unit, in a case where data of a memory page judged to be a discardable memory page by said check, and data of a file corresponding to said memory page, are different, and writing back data of said memory page to said detected file.

44. The computer program according to claim 41, for executing on a real computer:
- a process of synchronizing data of a discardable memory page and data of a file corresponding to said memory page, from an arbitrary point in time before said virtual machine completes hibernation, and
- a process of setting a memory page so as not be used, when writing to a file after said synchronization.

45. The computer program according to claim 41, for executing on a real computer,
- a process of setting a memory page so as not be used, when writing to a file, from an arbitrary point in time before said virtual machine has completed hibernation, and
- a process, after said setting, of synchronizing data of a discardable memory page and data of a file corresponding to said memory page.

* * * * *